United States Patent
Taylor et al.

(10) Patent No.: US 11,801,446 B2
(45) Date of Patent: Oct. 31, 2023

(54) SYSTEMS AND METHODS FOR TRAINING AN ARTIFICIAL INTELLIGENCE MODEL FOR COMPETITION MATCHES

(71) Applicant: Sony Interactive Entertainment Inc., Tokyo (JP)

(72) Inventors: Michael Taylor, San Mateo, CA (US); Javier Fernandez Rico, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 1158 days.

(21) Appl. No.: 16/355,560

(22) Filed: Mar. 15, 2019

(65) Prior Publication Data
US 2020/0289938 A1   Sep. 17, 2020

(51) Int. Cl.
*A63F 13/00* (2014.01)
*A63F 13/58* (2014.01)
*A63F 13/35* (2014.01)
*G06N 20/00* (2019.01)

(52) U.S. Cl.
CPC .............. *A63F 13/58* (2014.09); *A63F 13/35* (2014.09); *G06N 20/00* (2019.01); *A63F 2300/65* (2013.01)

(58) Field of Classification Search
CPC ...... A63F 13/58; A63F 13/35; A63F 2300/65; G06N 20/00
See application file for complete search history.

(56) References Cited

U.S. PATENT DOCUMENTS

| | | | |
|---|---|---|---|
| 10,617,961 B2* | 4/2020 | Ma | A63F 13/847 |
| 2004/0138959 A1* | 7/2004 | Hlavac | A63F 13/58 |
| | | | 706/46 |
| 2007/0218987 A1* | 9/2007 | Van Luchene | A63F 13/67 |
| | | | 463/30 |
| 2010/0257214 A1* | 10/2010 | Bessette | G16H 10/60 |
| | | | 707/812 |
| 2015/0293668 A1 | 10/2015 | Kurabayashi | |
| 2018/0001205 A1 | 1/2018 | Osman et al. | |

(Continued)

OTHER PUBLICATIONS

Unknown, "AlphaStar: Mastering the Real-Time Strategy Game StarCraft II", Jan. 24, 2019, pp. 1-7, XP055698054, URL:https://deepmind.com/blog/article/alphastar-mastering-real-time-strategy-game-starcraft-ii.

(Continued)

*Primary Examiner* — Dmitry Suhol
*Assistant Examiner* — Jason Pinheiro
(74) *Attorney, Agent, or Firm* — Penilla IP, APC

(57) ABSTRACT

A method for training a character for a game is described. The method includes facilitating a display of one or more scenes of the game. The one or more scenes include the character and virtual objects. The method further includes receiving input data for controlling the character by a user to interact with the virtual objects and analyzing the input data to identify interaction patterns for the character in the one or more scenes. The interaction patterns define inputs to train an artificial intelligence (AI) model associated with a user account of the user. The method includes enabling the character to interact with a new scene based on the AI model. The method includes tracking the interaction with the new scene by the character to perform additional training of the AI model.

23 Claims, 13 Drawing Sheets

(56) References Cited

U.S. PATENT DOCUMENTS

2018/0147489 A1* 5/2018 Shirakami ............. A63F 13/422
2018/0165596 A1* 6/2018 Abrams ................. G06N 3/006
2020/0197818 A1* 6/2020 Ma ....................... G06T 19/006

OTHER PUBLICATIONS

Shohei et al., "Developing game AI agent behaving like human by mixing reinforcement learning and supervised learning", 2017 18th IEEE/ACIS Intl Conf. on Software Eng, Artificial Intelligence, Networking and Parallel/Dist. Computing, IEEE, Jun. 26, 2017, DOI: 10.1109/SNPD.2017.8022767.
Nair et al., "Action Categorization for Computationally Improved Task Learning and Planning", arxiv.org, Cornell University Library, NY, Apr. 26, 2018, XP081230197, sec. LfD in RL, sec. 3, sections 5.1, 6.1, 6.2, section Combining ACR with HAT; p. 1, para 5—p. 2, para 2; figs. 4, 5, 8.
Taylor et al., "Using Human DemonsliaLions to Improve Reinforcement Learning", the AAAI Spring Sym., Mar. 31, 2011, XP055698065, https://www.aaai.org/ocs/index.php/SSS/SSS11/paper/viewPaper/2384.
PCT/US2020/018749, Invitation to Pay Additional Fees, PCT/ISA/206, Annex, dated Jun. 3, 2020.
PCT/US2020/018749, International Search Report, PCT/ISA/210, European Patent Office, NL, dated Jul. 24, 2020.

* cited by examiner

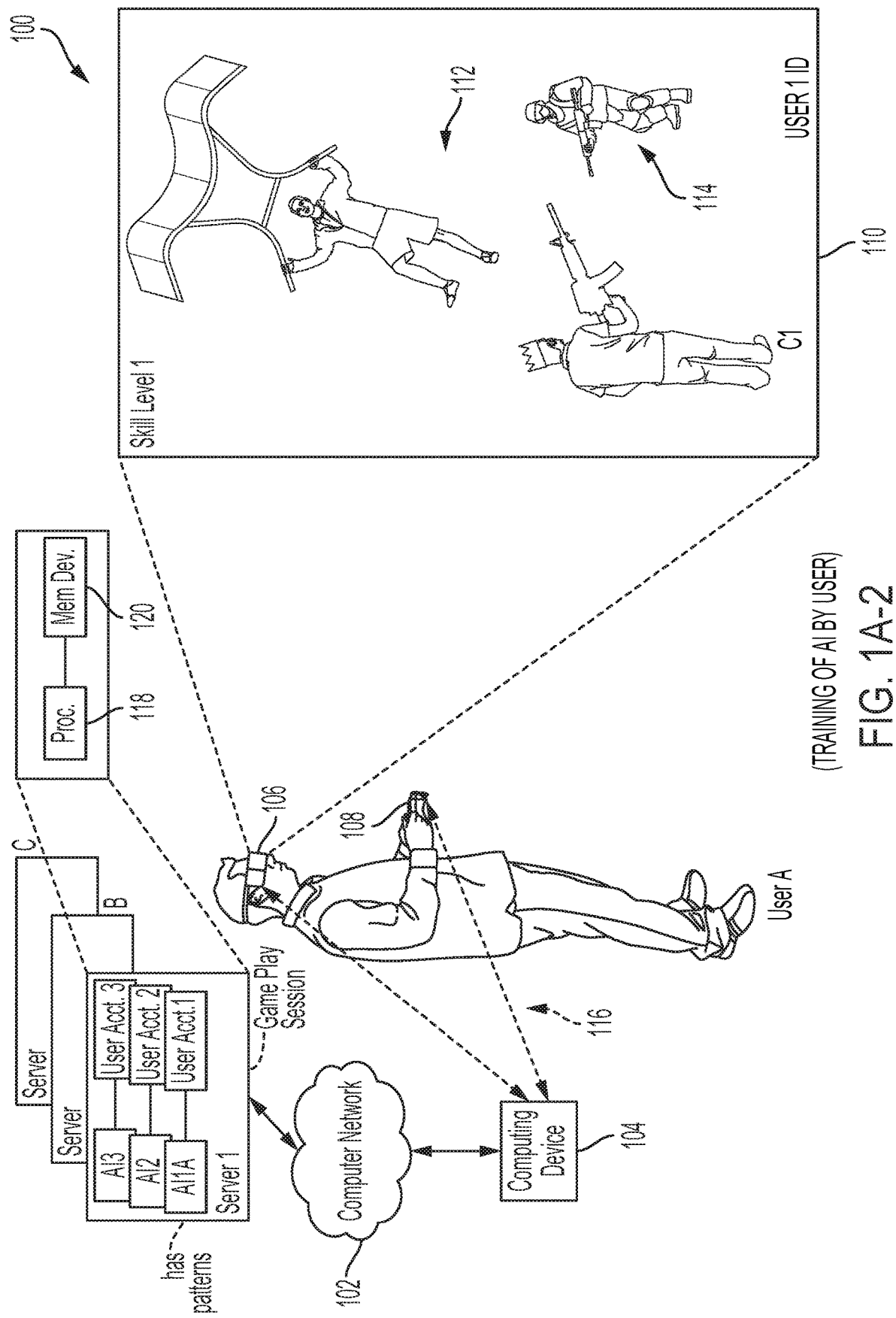
FIG. 1A-2 (TRAINING OF AI BY USER)

(TRAINING OF AI BY ANOTHER AI)

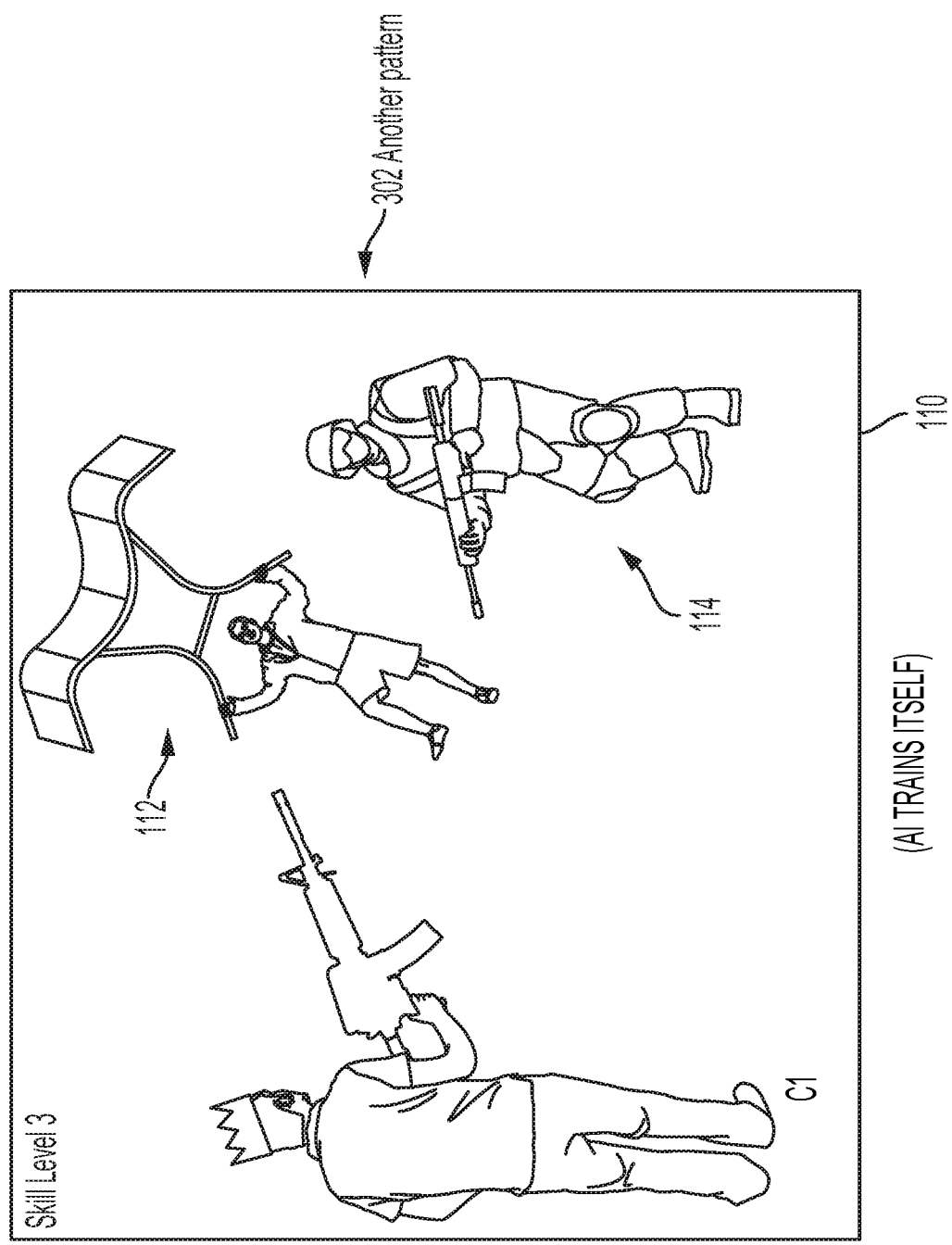

(PASSIVELY WATCH AIs COMPETE)

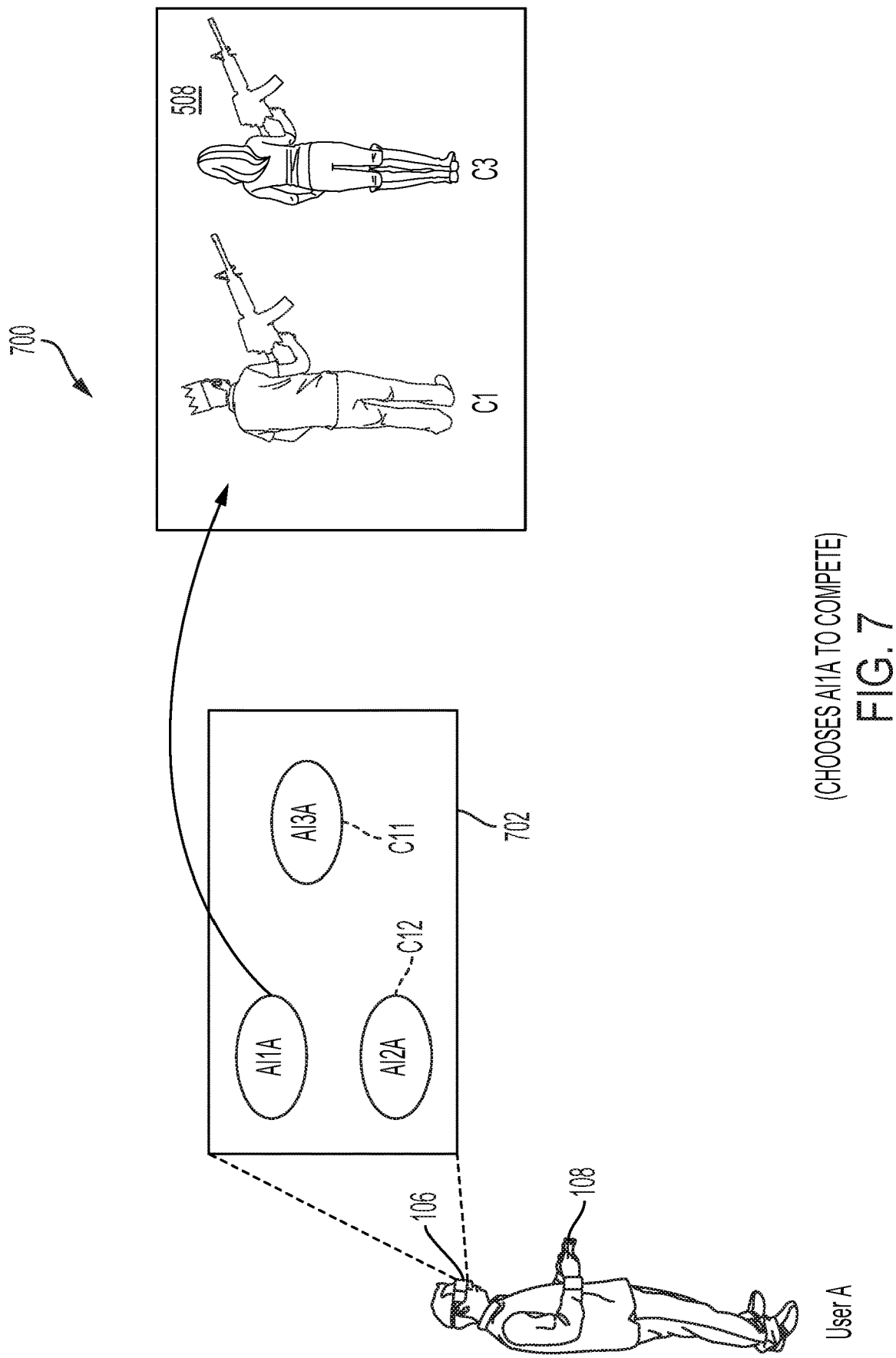

SYSTEMS AND METHODS FOR TRAINING AN ARTIFICIAL INTELLIGENCE MODEL FOR COMPETITION MATCHES

FIELD

The present disclosure relates to systems and methods for training an artificial intelligence (AI) model for competition matches.

BACKGROUND

A video game, these days, is accessed over a computer network. For example, Fortnite™ game is played by many players from different parts of the world. One player controls a first avatar and another player controls a second avatar. Each avatar collects weapons and cuts wood during the game. The avatars are then forced to be confined within a virtual circle. If the avatars are left behind outside the virtual circle, the avatars virtually die in the game. When both the avatars are in the circle, they find each other and then battle against each other with their weapons. Only one of the two avatars survive.

However, during a play of the game in which millions of players are playing the game worldwide, there is an increase in network traffic.

SUMMARY

Embodiments of the present disclosure provide systems and methods for training an artificial intelligence (AI) model for competition matches.

Other aspects of the present disclosure will become apparent from the following detailed description, taken in conjunction with the accompanying drawings, illustrating by way of example the principles of embodiments described in the present disclosure.

The systems and methods described herein enable players to setup matches against artificial intelligence (AI) models of other users. For example, an artificial intelligence model is constructed over time to match a player's or user's game skills, and other artificial intelligence models are constructed for other players or users. The user may wish to find out if his/her artificial intelligence model can beat the an artificial intelligence model of his/her friend, and then the user and his/her friend watch the virtual characters that represent the artificial intelligence models compete. This provides for custom matches that are set up and passively watched by the users.

In an embodiment, a method for training a character for a game is described. The method includes facilitating a display of one or more scenes of the game. The one or more scenes include the character and virtual objects. The method further includes receiving input data for controlling the character by a user to interact with the virtual objects and analyzing the input data to identify interaction patterns for the character in the one or more scenes. The interaction patterns define inputs to train an AI model associated with a user account of the user. The method includes enabling the character to interact with a new scene based on the AI model. The method includes tracking the interaction by the character with the new scene to perform additional training of the AI model.

In one embodiment, a server for training a character for a game is described. The server includes a processor configured to facilitate a display of one or more scenes of the game. The one or more scenes include the character and virtual objects. The processor receives input data for controlling the character by a user to interact with the virtual objects and analyzes the input data to identify interaction patterns for the character in the one or more scenes. The interaction patterns define inputs to train an AI model associated with a user account of the user. The processor enables the character to interact with a new scene based on the AI model. The character interacts with the new scene in accordance with the AI model. The processor tracks the interaction by the character with the new scene to perform additional training of the AI model. The server includes a memory device coupled to the processor and the memory device is configured to store the AI model.

In an embodiment, a computer readable medium containing program instructions is described. An execution of the program instructions by one or more processors of a computer system causes the one or more processors to carry out a plurality of operations including facilitating a display of one or more scenes of the game. The one or more scenes include the character and virtual objects. The plurality of operations further include receiving input data for controlling the character by a user to interact with the virtual objects and analyzing the input data to identify interaction patterns for the character in the one or more scenes. The interaction patterns define inputs to train an AI model associated with a user account of the user. The plurality of operations includes enabling the character to interact with a new scene based on the AI model. The plurality of operations includes tracking the interaction by the character with the new scene to perform additional training of the AI model.

Some advantages of the herein described systems and methods include that actions performed by a user during a play of the game are monitored so that an artificial intelligence model can learn from the actions. Also, the artificial intelligence model learns by itself during execution of a game program of the game, learns from other artificial intelligence models during execution of the game program, and learns from new scenes of the game. These types of learning by the artificial intelligence model reduces an amount of input data being transferred during the play of the game between a client device, such as a hand-held controller or a head-mounted display or a computing device, and one or more servers while at the same time providing a better gaming experience to the user. The reduction in the amount of input data reduces an amount of network traffic being transferred between the client device and the one or more servers. The reduction in the amount of network traffic increases the speed of transfer of network data between the client and the one or more servers. As such, when the artificial intelligence mall is trained, the input data that is transferred via a computer network is reduced to decrease network latency.

Also, the generation of the input data is less predictable than use of the artificial intelligence model during execution of the game program. For example, a human user may take a long time to select a button on a hand-held controller or to make a gesture or takes breaks during gameplay. This makes generation and transfer of input data from the client device to one or more of the servers less predictable. As such, management of network traffic by the one or more servers or by the computer network becomes less predictable. With use of the artificial intelligence model, the human factor becomes less important and predictability of network traffic increases to achieve better network traffic management.

BRIEF DESCRIPTION OF THE DRAWINGS

Various embodiments of the present disclosure are best understood by reference to the following description taken in conjunction with the accompanying drawings in which:

FIG. 1A-2 is a diagram of an embodiment of another system to illustrate training of the AI model by a user.

FIG. 2 is a diagram of an embodiment of a virtual scene to illustrate training of the artificial intelligence model by another artificial intelligence model.

FIG. 3-1 is a diagram of embodiments of a virtual scene to illustrate that the artificial intelligence model trains itself.

FIG. 3-2 is a diagram of an embodiment to illustrate an analysis by the artificial intelligence model to determine that an artificial intelligence model that has learned from one or more interaction patterns produces better outcomes or results compared to the AI model that has learned from other one or more interaction patterns.

FIG. 7 is a diagram of an embodiment to illustrate a selection of an artificial intelligence model from multiple artificial intelligence models.

DETAILED DESCRIPTION

Systems and methods for training an artificial intelligence (AI) model for competition matches are described. It should be noted that various embodiments of the present disclosure are practiced without some or all of these specific details. In other instances, well known process operations have not been described in detail in order not to unnecessarily obscure various embodiments of the present disclosure.

Figures 1, 1A:
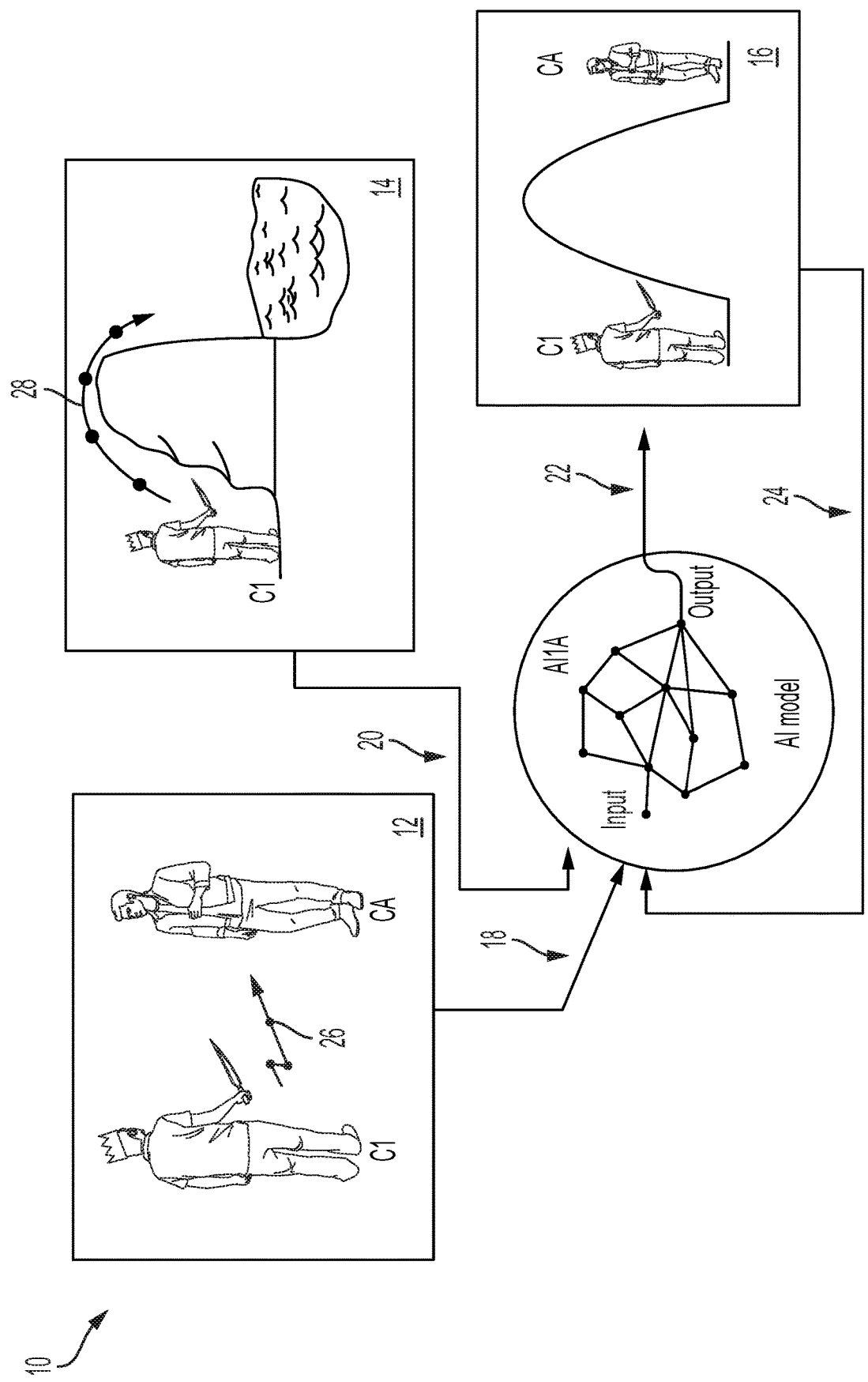
FIG. 1A-1 is a diagram of an embodiment of a system to illustrate training of an artificial intelligence (AI).

FIG. 1A-1 is a diagram of an embodiment of a system 10 to illustrate an artificial intelligence model AI1A. The system 10 includes a virtual scene 12, another virtual scene 14, the AI model AI1A, and another virtual scene 16. The virtual scenes 12, 14, and 16 illustrated in FIG. 1A-1 are displayed on a head mounted display or on another display device, such as a television or a computer or a smart phone or a tablet, during a play of a video game or an interactive game. In the virtual scene 12, a character C1 wields a weapon towards another character CA. The character C1 moves towards the character CA in a pattern 26 to virtually kill the character CA.

Similarly, in the virtual scene 14, the character C1 climbs on top of a virtual mountain and takes a dive in virtual water that is at the other side of the virtual mountain. The character C1 follows a pattern 28 of movement to climb on top of the virtual mountain and to dive in the virtual water.

The AI model AI1A receives the pattern 26 as an AI input 18 and the pattern 28 as an AI input 20, and learns from the patterns 26 and 28 to generate an AI output 22, which is a learned method. The AI output 22 is applied by the AI model AI1A to the virtual scene 16 as an AI input. For example, the character C1, who has no virtual weapon in the virtual scene 16, is controlled by the AI model AHA to climb on top of a virtual mountain in the virtual scene 16 but not take a dive. The character C1 descends down the virtual mountain to meet the character CA and fights the character CA with its bare fist. In the virtual scene 16, there is no virtual water but there is the virtual mountain and the character CA on the other side of the virtual mountain.

While interacting with the virtual scene 16 via the character C1, the AI model AI1A determines that a game level, such as a number of virtual coins or game points, increases when the character C1 climbs the virtual mountain the virtual scene 16 and defeats the character CA with its bare first compared to when the character C1 climbs the virtual mountain but does not defeat the character CA or compared to when the character C1 does not climb the virtual mountain but goes elsewhere in the virtual scene 16. Based on the determination regarding the game level, the AI model AHA learns an interaction pattern 24, e.g., climbing the virtual mountain and fighting with the character CA bare-fisted. The AI model AHA applies the interaction pattern 24 to itself to learn or train from the interaction pattern for another instance of the video game or the interactive game.

Figure 2:
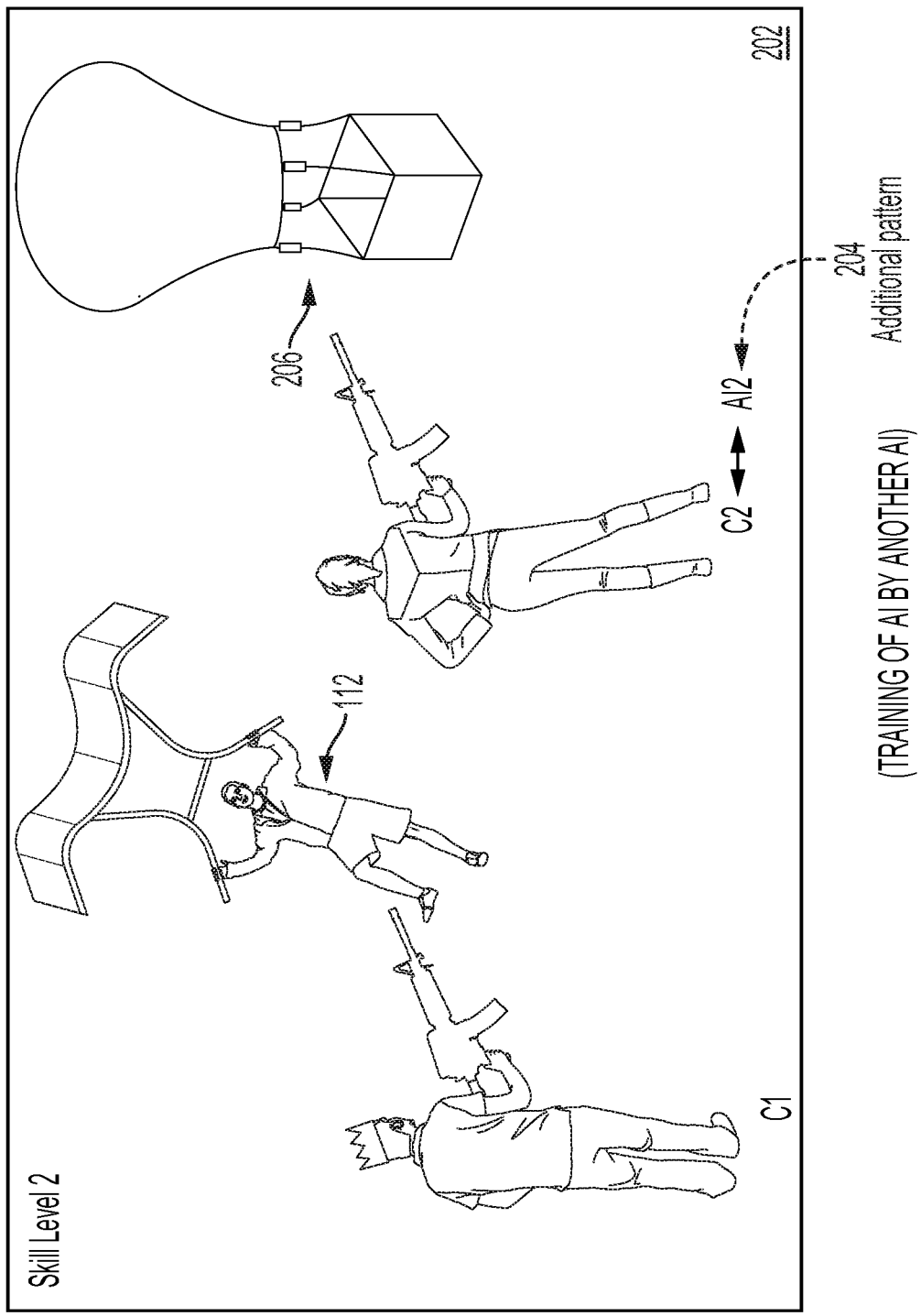

FIG. 1A-2 is a diagram of an embodiment of a system 100 to illustrate training of the AI model AHA by a user A so that the artificial intelligence model AHA reacts in the same or similar manner in which the user A reacts during a play of the game. As an example, an artificial intelligence model, as described herein, is a neural network of neural nodes. Each neural node may be a server or a processor. The neural nodes are coupled to each other via connections. For example, two adjacent neural nodes are connected to each other via a connection. As another example, two server nodes are coupled to each other via a network cable or two processors are connected to each other via a cable. An AI input is fed into the neural network to produce an AI output. The system 100 includes multiple servers A, B, and C. Moreover, the system 100 includes a computer network 102 and a computing device 104. Also, the system 100 includes a head-mounted display (HMD) 106 and a hand-held controller 108.

As used herein, a server includes one or more processors and one or more memory devices. For example, the server 1 includes a processor 118 and a memory device 120. The processor 118 is coupled to the memory device 120. One or more memory devices of one or more of the servers A, B, and C store one or more AI models, described herein. Examples of a processor include an application specific integrated circuit (ASIC), a programmable logic device (PLD) a microprocessor, and a central processing unit. Examples of a memory device include a read-only memory device (ROM) and a random access memory device (RAM). To illustrate, a memory device is a nonvolatile memory device or a volatile memory device. Illustrations of a memory device include a redundant array of independent disks (RAID) and a flash memory. Examples of a hand held controller, as described herein, include a PlayStation Move™ controller, a joystick, a gun-shaped controller, and a sword-shaped controller.

The computer network 102 is a wide area network, such as Internet, or a local area network, or a combination thereof. Examples of a computing device, described herein, include a game console or a computer, such as a desktop or laptop or a smartphone. The HMD 106 is coupled to the computing device 104 via a wired or wireless connection and the hand-held controller 108 is coupled to the computing device 104 or the HMD 106 via a wired or wireless connection. Examples of a wired connection, as used herein, between a hand-held controller and a computing device or between an HMD and the computing device or between a camera and the computing device include a coaxial cable connection or a universal serial bus (USB) cable connection. Examples of a wireless connection, as used herein, between a hand-held controller and a computing device or between an HMD and the computing device of between the HMD and the hand-held controller or between a camera and the computing device include a Wi-Fi connection or a Bluetooth connection or a short-range wireless connection. The computing device 104 is coupled via the computer network 102 to the servers A, B and C.

The user A logs into a user account 1, which is assigned to the user A, to access a game session of a game. For example, a user identification (ID) is authenticated by one or more of the servers A, B, and C to allow the user A to log into the user account 1. Data regarding a user account is stored in one or more memory devices of the one or more servers A, B, and C. For example, the user ID of the user account 1 is stored in the memory device 120, a user ID of another user account 2 is stored in the memory device 120, and a user ID of another user account 3 is stored in the memory device 120. The user account 2 is assigned to another user B and the user account 3 is assigned to yet another user C. After logging into the user account 1, during the game session, a game program is executed by one or more of the servers A, B, and C, such as by the processor 118, to provide cloud gaming. When the game program is executed by one or more of the servers A, B, and C, one or more image frames for displaying a virtual scene are produced by the one or more of the servers A, B, and C. An example of a virtual scene, as used herein, includes a virtual reality (VR) scene.

The image frames are sent from one or more of the servers A, B, and C to the HMD 106 via the computer network 102 and the computing device 104 for display of the virtual scene on a display device of the HMD 106. Examples of a display device include a liquid crystal display (LCD) and a light emitting diode display (LED).

Upon viewing the virtual scene, the user A operates the hand-held controller 108 to select one or more buttons on the hand-held controller 108 and/or to move one or more joysticks on the hand-held controller 108. The hand-held controller 108 is operated by the user A to generate input data 116.

The input data 116 is sent from the hand-held controller 108 via the wired or wireless connection to the computing device 104. The computing device 104 applies a network communication protocol, such as an Internet protocol or a Transmission Control Protocol (TCP)/IP protocol, to packetize the input data to generate one or more packets and sends the one or more packets via the computer network 102 to one or more of the servers A, B, and C. The one or more of the servers A, B, and C apply the network communication protocol to obtain the input data 116 from the packets. One or more of the servers A, B, and C execute the game program to analyze the input data 116 to generate one or more image frames of a virtual scene 110 in which the character C1, which represents the artificial intelligence model AI1A, is shooting a virtual object 112 instead of another virtual object 114 in the virtual scene 110. For example, when the user A uses the hand-held controller 108 to generate the input data 116, one or more of the servers A, B, and C determine that the character C1 that represents the artificial intelligence model AI1A shoots the virtual object 112 before shooting the virtual object 114 in the virtual scene 110 to generate the one or more image frames for the display of the virtual scene 110.

Examples of a virtual object include a virtual character, a game character, a virtual weapon, a virtual vehicle, a virtual airplane, a virtual box, a virtual balloon, and an avatar that represents a user. The character C1 when controlled by the artificial intelligence model AI1A is a non-player character (NPC). The virtual object 112 is a character that uses a virtual parachute and is about to land on ground within the virtual scene 110. Also, the virtual object 114 is a character that is about to shoot the character C1. The artificial intelligence model AI1A is associated with, for example, is mapped with or linked to, the user account 1 by one or more of the servers A, B, and C. Similarly, another artificial intelligence model AI2 is associated with the user account 2 by one or more of the servers A, B, and C, and yet another artificial intelligence model AI3 is associated with the user account 3 by one or more of the servers A, B, and C.

The one or more of the servers A, B, and C analyze the input data 116 to determine or identify one or more interaction patterns 119 of the character C1 associated with the input data 116. As an example, the one or more interaction patterns 119 that are determined or identified indicate that in the virtual scene 110, the character C1 shoots the virtual object 112 before shooting the virtual object 114. The character C1 shoots the virtual object 112 when the user A uses a joystick of the hand-held controller 108 to point to the virtual object 112 and selects a button on the hand-held controller 108 to shoot at the virtual object 112. In the virtual scene 110, the character C1 that represents the artificial intelligence model AI1A is facing the virtual object 112, who is about to land, and also faces the other virtual object 114, who is about to shoot the character C1. As yet another example, the one or more interaction patterns 119 that are determined indicate that for a majority of instances of a virtual scene in which the character C1 faces virtual object, who is flying, and also faces another virtual object, who is about to shoot the character C1, it is more likely that the character C1 will shoot the flying virtual object before shooting the other virtual object.

One or more of the servers A, B, and C store the one or more interaction patterns 119 within one or more memory devices of the one or more servers A, B, and C as a training program to train the artificial intelligence model AI1A. For example, the one or more interaction patterns 119 are provided as inputs to the artificial intelligence model AI1A to enable the artificial intelligence model AI1A to learn from the one or more interaction patterns 119, and the learned methods or operations are applied by the artificial intelligence model AI1A to new virtual scenes, which are different from the virtual scene 110. The new virtual scenes are displayed from image frames that are generated by execution of the game program by one or more of the servers A, B, and C. The learned methods or operations may also be applied to virtual scenes that are similar to or the same as the virtual scene 110.

One or more of the servers A, B, and C apply the network communication protocol to packetize the one or more image frames for the virtual scene 110 in which the character C1 shoots the virtual object 112 instead of the virtual object 114 to generate one or more packets, and sends the packets via the computer network 102 to the computing device 104. The computing device 104 applies the network communication protocol to depacketize the one or more packets to obtain the one or more image frames and sends the one or more image frames via the wired or wireless connection to the HMD 106 for display of the virtual scene 110 that illustrates the shooting on the display device of the HMD 106.

In an embodiment, one or more of the servers A, B, and C associate the one or more interaction patterns 119 with the virtual scene 110 having the character C1, the virtual object 112, and the virtual object 114 or with another virtual scene that is similar to the virtual scene 110 in which one virtual object is flying and another virtual object is about to land on virtual ground. For example, one or more of the servers A, B, and C generate an identifier of the one or more interaction patterns 119 and establish a mapping, such as a one-to-one correspondence or a link, between the identifier the one or more interaction patterns 119 and an identifier of the virtual scene 110. The mapping is stored within one or more memory devices of one or more of the servers A, B, and C for access by the artificial intelligence model AI1A for its training.

In one embodiment, the HMD 106 communicates with the computer network 102 via a wireless network interface controller (WNIC) and there is no need for the computing device 104 for the HMD 106 to communicate with the computer network 102.

In an embodiment, an HMD or a computing device, described herein, communicates with one or more of the servers A, B, and C via the computer network 102 using a fifth-generation (5G) network protocol. Like the earlier generation second-generation (2G), third-generation (3G), and fourth-generation (4G) mobile networks, 5G networks are digital cellular networks in which a service area covered by providers is divided into a mosaic of small geographical areas called cells. Analog signals representing sounds and images are digitized in a computing device or an HMD by being converted by an analog to digital converter in the computing device or the HMD, and transmitted as a stream of bits via the computer network 102 to one or more of the servers A, B, and C. All 5G wireless devices, including the computer or the HMD, in a cell have transceivers that communicate via radio waves with a local antenna array and with a low power automated transceiver in the cell, over frequency channels assigned by the low power automated transceiver from a common pool of frequencies, which are reused in geographically separated cells. The local antennas are connected with a telephone network and the computer network 102 by a high bandwidth optical fiber or wireless backhaul connection. When a user crosses from one cell to another, the HMD or the computing device is automatically handed off seamlessly to the antenna in the new cell. An advantage is that 5G networks achieve much higher data rate than previous cellular networks, which achieve up to 10 Gbit/s, and is 100 times faster than the 4G long term evolution (LTE) cellular technology.

In an embodiment, the computing device 104, such as a smart phone, is a part of the HMD 106. For example, a display device of the computing device 104 is used as a display device of the HMD 106.

In one embodiment, instead of the HMD 106, the game is displayed on the computing device 104 or a television, which is coupled to the computing device 104 via a wireless or wired connection.

In an embodiment, instead of a hand-held controller, one or more glove controllers or one or more ring controllers or no controllers are used. For example, the glove controllers are worn on hands of a user and the ring controllers are worn on fingers of the hands of the user. When no controllers are used, the user makes gestures of one or more of his/her body parts and the gestures are captured by an image capture device, such as a camera. Examples of the camera include a depth camera, a video camera, and a digital camera. The image capture device is placed in the same real-world environment, such as a room or a warehouse or a building or a house, in which the user is located. The camera is coupled via a wired or wireless connection to a computing device to communicate input data, which includes gesture data identifying the gestures, via the computing device and the computer network 102 to the servers A, B, and C. In the embodiment in which the computing device is not used, the camera includes a network interface controller, such as a network interface card (NIC) or a wireless network interface card, to communicate with the servers A, B, and C.

In one embodiment, an HMD includes one or more cameras that capture gestures that are made by hands of a user to output gesture data.

In one embodiment, the operations, described herein, as being performed by one or more of the servers A, B, and C are performed by one or more processors within the one or more of the servers.

In an embodiment, all artificial intelligence models, such as the artificial intelligence models AI1A, AI2, and AI3, described herein are executed by one or more of the servers A, B, and C. For example, each server is a node of the artificial intelligence model. As another example, two or more servers form a node of the artificial intelligence model. A connection between any two servers is a connection between any two nodes of the artificial intelligence model. In one embodiment, an artificial intelligence, described herein, is a combination of one or more of the servers A, B, and C and a computer operation that is executed by one or more of the servers A, B, and C. In an embodiment, an artificial intelligence model, described herein, learns from one or more interaction patterns and the learned operations of the artificial intelligence model are applied by one or more of the servers A, B, and C to achieve a result.

It should be noted that all operations described herein with reference to the virtual scene 110 apply equally to multiple virtual scenes that are displayed on the HMD 106.

Figure 1B:
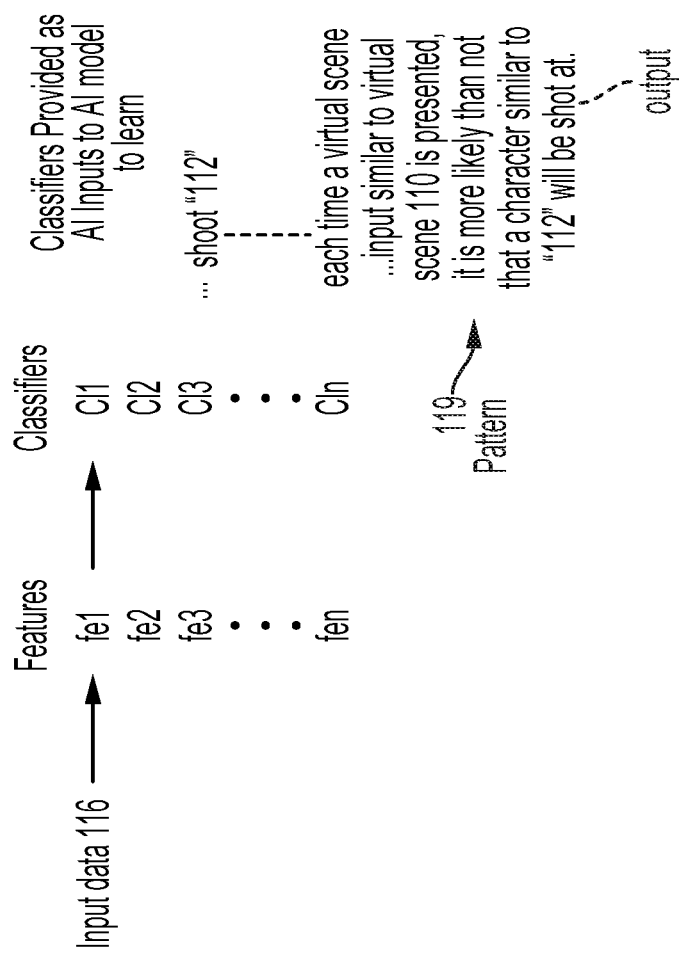
FIG. 1B is a diagram of an embodiment to illustrate training of the artificial intelligence model by the user.

FIG. 1B is a diagram of an embodiment to illustrate training of the artificial intelligence model AI1A. One or more of the servers A, B, and C analyze the input data 116 to identify functions, such as f1, f2, f3 through fn, associated with the input data 116. For example, the input data 116 is analyzed to determine that a button, labeled X, of the hand-held controller 108 is selected by the user A or that a joystick is moved in an upward direction by the user A, or that the user A slides his/her finger across a touchscreen of the hand-held controller 108, or a gesture is made by the user A. Examples of the function associated with the input data 116 include a selection of a button or movement of a finger across a touchscreen or a directional or rotational movement of a joystick, of the hand-held controller 108 that is operated by the user A. To further illustrate, examples of the function associated with the input data 116 include a selection of a button on the hand-held controller 108, a movement of a joystick of the hand-held controller 108 in a direction, a pointing gesture made by the user A, and a shooting gesture made by the user A, etc.

Each function f1 through fn the function associated with the input data 116 is a different function or a different gesture that is performed by the user A. For example, the function f1 is a selection of a button marked "O" on the hand-held controller 108 and the function f2 is a selection of another button marked "X" on the hand-held controller 108. As another example, the function f1 is a pointing gesture that is performed by a forefinger of a left hand of the user A and the function f2 is a shooting gesture that is performed by the forefinger and a middle finger of the left hand of the user A.

Based on the functions associated with the input data 116 and the virtual scene 110, one or more of the servers A, B, and C determine features, such as fe1, fe2 until fen, of the virtual scene 110 and classify the features to output classifiers, such as Cl1, Cl2, Cl3 through Cln. An example of a feature of the virtual scene 110 is the character C1 who is moving and shooting. Another example of the feature of the virtual scene 110 is the virtual object 112 who is flying with a virtual parachute in virtual air. Yet another example of the feature of the virtual scene 110 is the virtual object 114 who is holding a virtual gun. An example of a classifier includes a function or movement or operation or a combination thereof that is performed by the character C1 based on an operation of the hand-held controller 108 or based on one or more gestures that are made by the user A. To illustrate, examples of a classifier include that the character C1 shot the virtual object 112 or opened a treasure chest of the game or landed on a virtual building of the game or shot a virtual airplane in the game. To further illustrate, an example of the classifier Cl2 is that the character C1 moves towards the virtual object 112. An example of the classifier Cl3 is that the character C1 shot the virtual object 112. An example of the classifier Cl4 is that the character C1 did not shoot the virtual object 114 and an example of the classifier Cln is that the virtual object 114 shot the virtual object 114 after shooting the virtual object 112. Each classifier identifies a movement or an operation performed by the character C1 when present in the virtual scene 110. Each classifier Cl1 through Cln corresponds to a different function or movement or a combination thereof that is performed by the character C1 in the virtual scene 110. For example, the classifier Cl1 is a shooting function and the classifier Cl2 is a jumping function in the virtual scene 110.

The classifiers are provided as AI inputs to the artificial intelligence model AI1A by one or more of the servers A, B, and C to train the artificial intelligence model AI1A. For example, the processor 118 identifies the one or more interaction patterns 119 within the classifiers for the virtual scene 110. To illustrate, upon determining from the one or more interaction patterns 119 that the character C1 shoots the virtual object 112 instead of shooting the virtual object 114 when the character C1 is placed in the virtual scene 110 in which the virtual object 112 flies towards the character C1 and the virtual object 114 is about to shoot the character C1, one or more of the servers A, B, and C train the AI model AI1A to determine that it is more likely than not that when the character C1 is faced with the same situation or a similar situation in another instance of execution of the game program, the character C1 will shoot or will try to shoot at a virtual object that is flying first instead of shooting another virtual object on ground. An example of the similar situation is one in which a virtual object is flying towards the character C1 and another virtual object is on ground ready to shoot the character C1. Another example of the similar situation in one which a pre-determined number, such as a majority, of virtual objects are performing the same functions as that performed by the virtual objects 112 and 114 in the virtual scene 110. As another illustration, the processor 118 trains the AI model AI1A to determine that it is more likely than not that when the character C1 is presented with an instance in the game in which the character C1 is faced with shooting a virtual airplane that is flying towards the character C1 or a virtual weapon on ground that is about to shoot the character C1, the character C1 will shoot the virtual airplane that is flying towards the character C1. As yet another illustration, the processor 118 trains a neural network of the AI model AI1A to determine that given an input in which a virtual object is flying towards the character C1 and an input that another virtual object is about to shoot the character C1, it is more likely than not that an output will be that the character C1 will shoot the virtual object flying towards the character C1 first before shooting the other virtual object. As another illustration, one or more of the servers A, B, and C train the AI model AI1A by using the classifiers to determine that given a different or new virtual scene in which no virtual object is flying or trying to shoot at the character C1, the character C1 does not shoot at any of the virtual objects but dances in front of them or exchanges virtual weapons with them. An example of the different or new virtual scene is one in which a pre-determined number, such as a majority, of virtual objects are performing different functions than those performed in the virtual scene 110. To illustrate, a virtual object in the new or different virtual scene is collecting wood or is dancing and does not have a virtual weapon pointed towards the character C1.

The one or more interaction patterns 119 that are identified are applied as AI inputs by one or more of the servers A, B, and C to the AI model AI1A. For example, the AI model AI1A is a set of computer operations that are executed by the processor 118 or by one or more of the servers A, B, and C. The set of computer operations are not written or coded by a human user but are learned by the AI model AI1A from virtual scenes or from other AI models or from operations performed by users via hand-held controllers or gestures or from competitions or a combination thereof.

FIG. 2 is a diagram of an embodiment of a virtual scene 202 to illustrate training of the artificial intelligence model AI1A by the artificial intelligence model AI2. The virtual scene 202 is generated in a similar manner in which the virtual scene 110 is generated by one or more of the servers A, B, and C during a play of the game. For example, image frames for displaying the virtual scene 110 are generated by one or more of the servers A, B, and C and sent via the computer network 102 and the computing device 104 to the HMD 106 for display of the virtual scene 202 on the HMD 106. However, it is not necessary for the virtual scene 202 to be displayed or the image frames regarding the virtual scene 202 to be generated for the artificial intelligence model AI1A to learn from the artificial intelligence model AI2.

The artificial intelligence model AI1A requests permission from the artificial intelligence model AI2 to train itself based on the artificial intelligence model AI2. For example, the processor 118 executes the artificial intelligence model AI1A to generate a request for the permission and sends the request via the user account 2 to the artificial intelligence model AI2. Upon receiving the request for the permission via the user account 2, one or more of the servers A, B, and C determine whether the request is to be granted. For example, the user B uses a hand-held controller to send data to the one or more of the servers A, B, and C indicating that the artificial intelligence model AI2 is not to be granted access to other users or is to be granted access to a selected group of users or is to be granted access to a private group of users or is to be granted access to all users that request access or is to be granted access to all users independent of whether the users request access to the artificial access model AI2. The data regarding the indication of the access to the artificial intelligence model is associated with, such as linked to or mapped to, to the user account 2. The artificial intelligence model AI2 is associated with the user account 2 and is created by the user B in a manner similar to a manner in which the artificial intelligence model AI1A is created by the user A.

Upon determining that the request is to be granted, one or more additional patterns 204 or additional classifiers of the artificial intelligence model AI2 are sent from one or more of the servers A, B, and C that execute the artificial intelligence model AI2 to one or more of the servers A, B, and C that execute the artificial intelligence model AI1A. The one or more additional patterns 204 used to train the artificial intelligence model AI2 are interaction patterns and are created by one or more of the servers A, B, and C in a similar manner in which the one or more interaction patterns 119 and other interaction patterns of the artificial intelligence model AI1A are created by one or more of the servers A, B, and C. The one or more additional patterns 204 are applied by one or more of the servers A, B, and C to train the artificial intelligence model AI2.

Upon receiving the one or more additional patterns 204, one or more of the servers A, B, and C provide the one or more additional patterns 204 as AI inputs to the artificial intelligence model AI1A to train the artificial intelligence model AI1A based on the one or more additional patterns 204. The artificial intelligence model AI1A learns from the one or more additional patterns 204. For example, the artificial intelligence model AI1A instead of controlling the character C1 to shoot the virtual object 112 that is flying towards the character C1 learns to control the character C1 to open a virtual object 206, such as a virtual box or virtual container, after the virtual object 206 lands on virtual ground. The virtual object 206 includes virtual weapons, such as guns and bullets, and virtual medicines and bandages. A character C2 that is controlled by the artificial intelligence AI2 assigned to the user account 2 also applies the one or more additional patterns 204 to open the virtual object 206. The virtual object 206, as illustrated, is a box that is attached to a balloon. The character C2 when controlled by the artificial intelligence model AI2 is an NPC.

In one embodiment, the artificial intelligence model AI2 has additional types of training, described herein, such as by training itself, or training from other artificial intelligence models, or from new virtual scenes.

In an embodiment, some characters in the game are controlled by users and the remaining characters in the game are NPCs, which are controlled by corresponding artificial intelligence models.

FIG. 3-1 is a diagram of embodiments of the virtual scene 110 to illustrate that the artificial intelligence model AI1A trains itself. For example, regardless of whether the user A is logged into the user account 1, the artificial intelligence model AI1A learns from one or more other patterns 302, which are interaction patterns, to increase a skill level associated with the user account 1. To illustrate, when the user A is logged out of the user account 1, the artificial intelligence model AI1A logs into the user account 1 and requests the processor 118 to execute the game program. When the game program is executed, the artificial intelligence model AI1A determines that a skill level, such as a game score or a game level or a number of virtual coins, of the game will increase when the character C1 is placed in the virtual scene 110 and the character C1 shoots the virtual object 114 first before shooting the virtual object 112. The one or more other patterns 302 indicate that when the character C1 is presented with the virtual scene 110 in which the virtual object 112 is flying towards the character C1 and the virtual object 114 is about to shoot the character C1, the character C1 should shoot the virtual object 114 first before shooting the virtual object 112 to increase the skill level associated with the user account 1. The skill level is increased compared to another skill level associated with the user account 1 and is an example of an AI output of the artificial intelligence model AI1A. The other skill level corresponds to training of the artificial intelligence model AI1A by applying the one or more interaction patterns 119, as illustrated with respect to FIGS. 1A-2 and 1B. The artificial intelligence model AI1A trains itself by applying the one or more other patterns 302 as AI inputs, which are inputs to the AI model AI1A.

As another illustration, when the user A is logged into the user account 1 and the virtual scene 110 is displayed on the display device of the HMD 106, the user A controls the hand-held controller 108 to shoot the virtual object 112 first instead of shooting the virtual object 114. The artificial intelligence model AI1A applies machine learning to determine that a skill level associated with the user account 1 increases when the character C1 shoots the virtual object 114 before shooting the virtual object 112 to learn from the one or more other patterns 302.

FIG. 3-2 is a diagram of an embodiment to illustrate an analysis by the artificial intelligence model AI1A to determine that an application of the one or more other patterns 302 as an AI input produces better outcomes or results compared to an application of the one or more interaction patterns 119 as an AI input. When the artificial intelligence model AI1A is trained to apply the one or more interaction patterns 119, multiple outputs O1, O2 through On are generated during execution of the game program by one or more of the servers A, B, and C. Examples of each output O1, O2 through On include a number of points accumulated during execution of the game program, a number of virtual character kills accumulated during execution of the game program, and a health level of the character C1.

Similarly, when the artificial intelligence model AI1A is trained to apply the one or more other patterns 302, multiple outputs O11, O12 through O11$n$ are generated during execution of the game program by one or more of the servers A, B, and C. Examples of each output O11, O12 through O11$n$ include a number of points accumulated during execution of the game program, a number of virtual character kills accumulated during execution of the game program, and a health level of the character C1. The artificial intelligence model AI1A learns by applying the one or more other patterns 302 during execution of the game program to achieve the outputs O11 through O11$n$ and determining that the outputs O11 through O11$n$ correspond to a skill level that is greater than a skill level corresponding to the outputs O1 through On. Upon determining that the outputs O11 through O11$n$ correspond to a skill level that is greater than a skill level corresponding to the outputs O1 through On, the artificial intelligence model AI1A determines to apply the one or more other patterns 302 instead of the one or more interaction patterns 119.

During additional instances of execution of the game program, the artificial intelligence model AI1A applies the one or more other patterns 302 instead of applying the interaction patterns 119. For example, during an additional instance of execution of the game program, when a virtual scenario is displayed on the HMD 106 in which a virtual character is about to shoot the character C1 and another virtual character is about to land in front of the character C1, the artificial intelligence model AI1A controls the character C1 to shoot the character that is about to shoot the character C1 first, and then shoot the virtual character who is about to land.

In one embodiment, the artificial intelligence model AI1A requests permission from the user A before applying one or more interaction patterns, described herein. For example, during a display of the virtual scene 110, one or more of the servers A, B, and C generate image frames including the request for permission and applies the network communication protocol to packetize the image frames to generate one or more packets, and sends the packets via the computer network 102 to the computing device 104. The computing device 104 applies the network communication protocol to depacketize the packets to obtain the image frames and sends the image frames to the HMD 106 via the wired or wireless connection for display of the request for permission. The user A uses the hand-held controller 108 to indicate whether the request is granted or denied. Upon receiving a positive indication that the request is granted, the positive indication is packetized by the computing device 104 to generate one or more packets, which are sent by the computer network 102 to the one or more servers A, B, and C. The one or more servers A, B, and C apply the network communication protocol to the packets to obtain the positive indication and send the positive indication to the artificial intelligence model AI1A. Upon receiving the positive indication, the artificial intelligence model AI1A applies the one or more interaction patterns.

On the other hand, upon receiving a negative indication that the request is denied, the negative indication is packetized by the computing device 104 to generate one or more packets, which are sent by the computer network 102 to the one or more servers A, B, and C. The one or more servers A, B, and C apply the network communication protocol to the packets to obtain the negative indication and send the negative indication to the artificial intelligence model AI1A. Upon receiving the negative indication, the artificial intelligence model AI1A does not apply the one or more interaction patterns.

Figure 4:
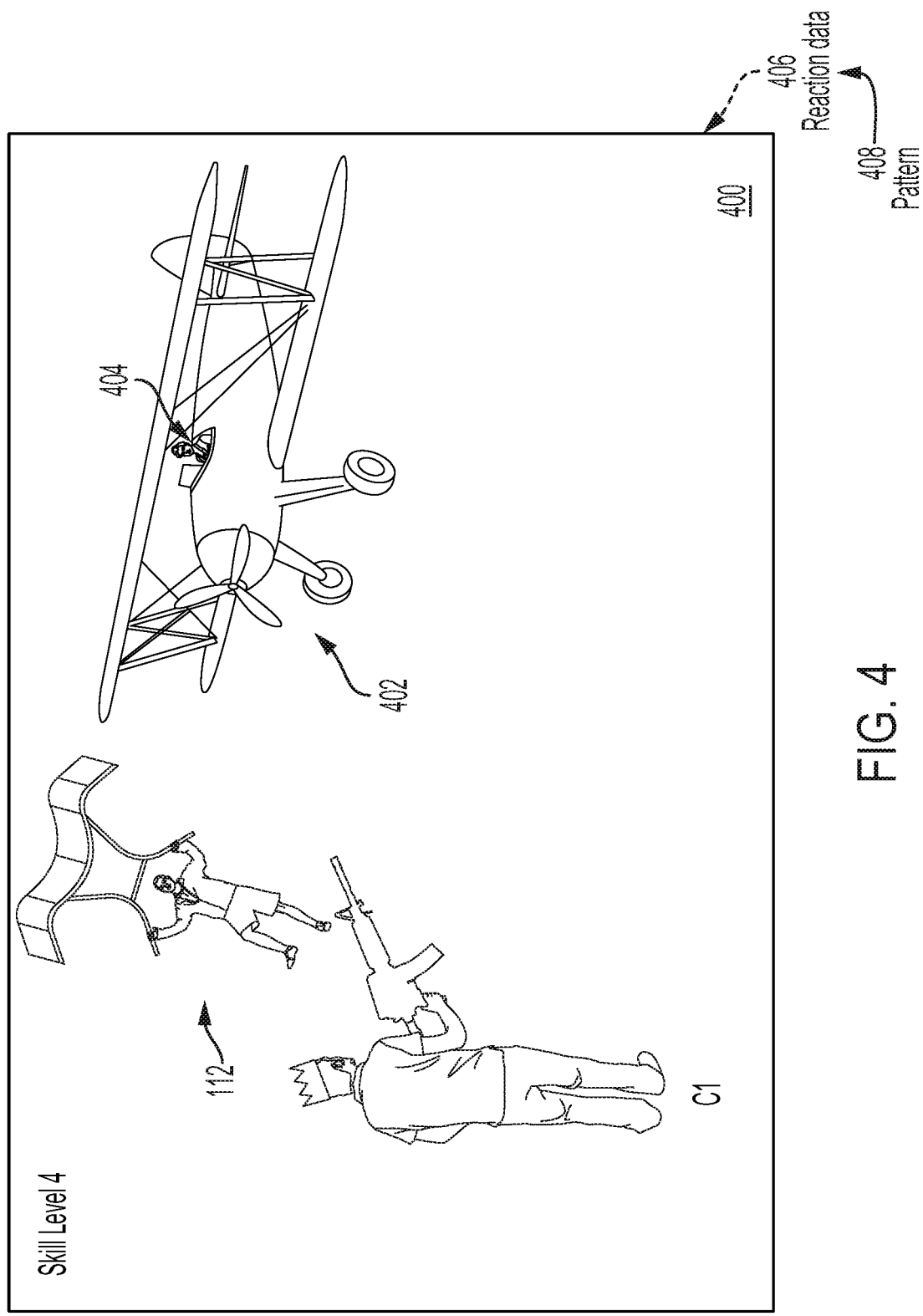
FIG. 4 is a diagram of an embodiment of a new virtual scene to illustrate that the new virtual scene is used to train the artificial intelligence model.

FIG. 4 is a diagram of an embodiment of a new virtual scene 400 to illustrate that the new virtual scene 400 is used to train the artificial intelligence model AI1A. The new virtual scene 400 is generated when one or more of the servers A, B, and C execute the game program to generate one or more image frames and apply the network communication protocol to packetize the image frames to generate one or more packets. As an example, the artificial intelligence model AI1A requests one or more of the servers A, B, and C to execute the game program to generate one or more image frames for displaying the new virtual scene 400. The packets are sent by one or more of the servers A, B, and C via the computer network 102 to the computing device 104. The computing device 104 applies the network communication protocol to extract the image frames from the packets and sends the image frames to the HMD 106 for display of the virtual scene 400. The virtual scene 400 includes the character C1, the virtual object 112, and another virtual object 402 but excludes the virtual object 114. The virtual object 402 is an airplane in which a virtual object 404 is seated and is shooting at the character C1. The virtual object 404 uses virtual guns of the virtual object 402 to shoot at the character C1. The virtual scene 400 has not been presented to the user A during a play of the game. For example, the user A has not reached a level during execution of the game program, and the level includes the virtual objects 402 and 404.

The artificial intelligence model AI1A that has learned from any interaction patterns described herein, such as the one or more interaction patterns 119, the one or more additional patterns 204, or the one or more other patterns 302, or a combination thereof, applies its learned operations to control the character C1 to shoot at the virtual object 402 or the virtual object 404 first instead of shooting the virtual object 112. For example, the artificial intelligence model AI1A determines that by shooting first at one or more of the virtual objects 402 and 404, a skill level associated with the user account 1 increases compared to a skill level achieved by shooting first the virtual object 112. The skill level that is increased is an example of reaction data 406. For example, the skill level that is increased includes a number of virtual coins corresponding to the user account 1, a virtual score corresponding to the user account 1, or a combination thereof.

Based on the reaction data 406, the artificial intelligence model AI1A determines or learns that following one or more additional interaction patterns 408 helps achieve the higher skill level. An example of the one or more additional interaction patterns 408 include shooting at the virtual object 402 or the virtual object 404 first then shooting of the virtual object 112. Upon determining so, the artificial intelligence model AI1A trains itself to apply the one or more additional interaction patterns 408 during a next or following instance of execution of the game program. For example, when faced with an instance of execution of the game program in which a flying virtual vehicle is approaching the character C1 and simultaneously a virtual character is about to land on a virtual ground, the artificial intelligence model AI1A controls the character C1 to shoot at the flying virtual vehicle first and then shoot at the virtual character now on the virtual ground.

When the artificial intelligence model AI1A is presented with the new virtual scene 400, the artificial intelligence model AI1A trains itself in a manner similar to that described above with reference to FIG. 3-2. For example, when presented with the new virtual scenario 400, the artificial intelligence model AI1A determines whether shooting down the virtual object 402 or the virtual object 404 before shooting the virtual object 112 increases a game level, such as a number of virtual points or a game score within the game. The increase in the game level is higher compared to an amount of an increase in the game level when the virtual object 112 is shot first by the character C1 before shooting the virtual object 402 or 404. Upon determining so, the artificial intelligence model AI1A learns to shoot a flying virtual airplane first before shooting a flying virtual character that is attached to a parachute. On the other hand, upon determining that the increase in the game level is lower compared to the amount of the increase in the game level when the virtual object 112 is shot first by the character C1 compared to shooting the virtual object 402 or 404, the artificial intelligence model AI1A learns to shoot a flying virtual character that is attached to a parachute first than shooting a flying virtual airplane.

Figure 5A:
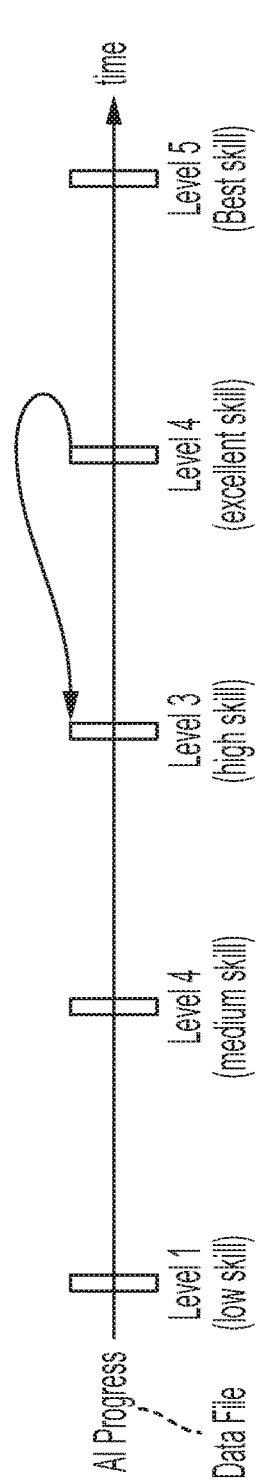
FIG. 5A is a diagram of an embodiment to illustrate that the artificial intelligence model can apply any skill level during a competition of a game.

FIG. 5A is a diagram of an embodiment to illustrate that the artificial intelligence model AI1A can apply any skill level ranging from 1 through 5 during a competition of the game. As an example, all training of the artificial intelligence model AI1A described herein is performed with intent to train the artificial intelligence model AI1A to compete against the artificial intelligence model AI3 in the game. In the competition, one or more virtual objects or virtual characters of the game compete to achieve a victory within the game, a pre-determined number of kills of other virtual characters in the game, a pre-determined number of virtual points in the game, or to survive, or a combination thereof. All the skill levels 1 through 5 are stored in a data file, which is stored in one or more memory devices of one or more of the servers A, B, and C. An example of the skill level 1 is a skill level before the user A trains the artificial intelligence model AI1A, as illustrated in FIGS. 1A-2 and 1B, and an example of the skill level 2 is a skill level after the user A trains the artificial intelligence model AI1A. An example of the skill level 2 is a skill level before the artificial intelligence model AI1A is trained by the artificial intelligence model AI2, as illustrated in FIG. 2, and an example of the skill level 3 is a skill level after the artificial intelligence model AI1A is trained by the artificial intelligence model AI2. Also, an example of the skill level 3 is a skill level before the artificial intelligence model AI1A trains itself, as illustrated in FIG. 3-1, and an example of the skill level 4 is a skill level after the artificial intelligence model AI1A trains itself. An example of the skill level 4 is a skill level before the new scene 400, illustrated in FIG. 4A, is used to train the artificial intelligence model AI1A and an example of the skill level 5 is a skill level after the new scene 400 is used to train the artificial intelligence model AI1A. The skill levels 1 through 5 are assigned to, such as mapped to or linked to, the artificial intelligence model AI1A by one or more of the servers A, B, and C.

The skill level 2 is greater than the skill level 1. Moreover, the skill level 3 is greater than the skill level 2, the skill level 4 is greater than the skill level 3, and the skill level 5 is greater than the skill level 4. For example, the skill level 1 is a low skill level, the skill level 2 is a medium skill level, the skill level 3 is a high skill level, and the skill level 4 is an excellent skill level, and the skill level 5 is the best skill level. The artificial intelligence model AI1A accesses any one of the skill levels 1 through 5 from the data file to apply during execution of the game program. There is an increase in the skill level of the artificial intelligence model AI1A with time t.

In one embodiment, the skill levels illustrated in FIG. 5A are skill levels of the artificial intelligence model AI1A and are also skill levels associated with the user account 1.

In an embodiment, the artificial intelligence model AI1A competes with the artificial intelligence model AI3 that controls a character C3.

In one embodiment the user account 3 and the artificial intelligence model AI3 are assigned to the user C other than the user B.

Figure 5B:
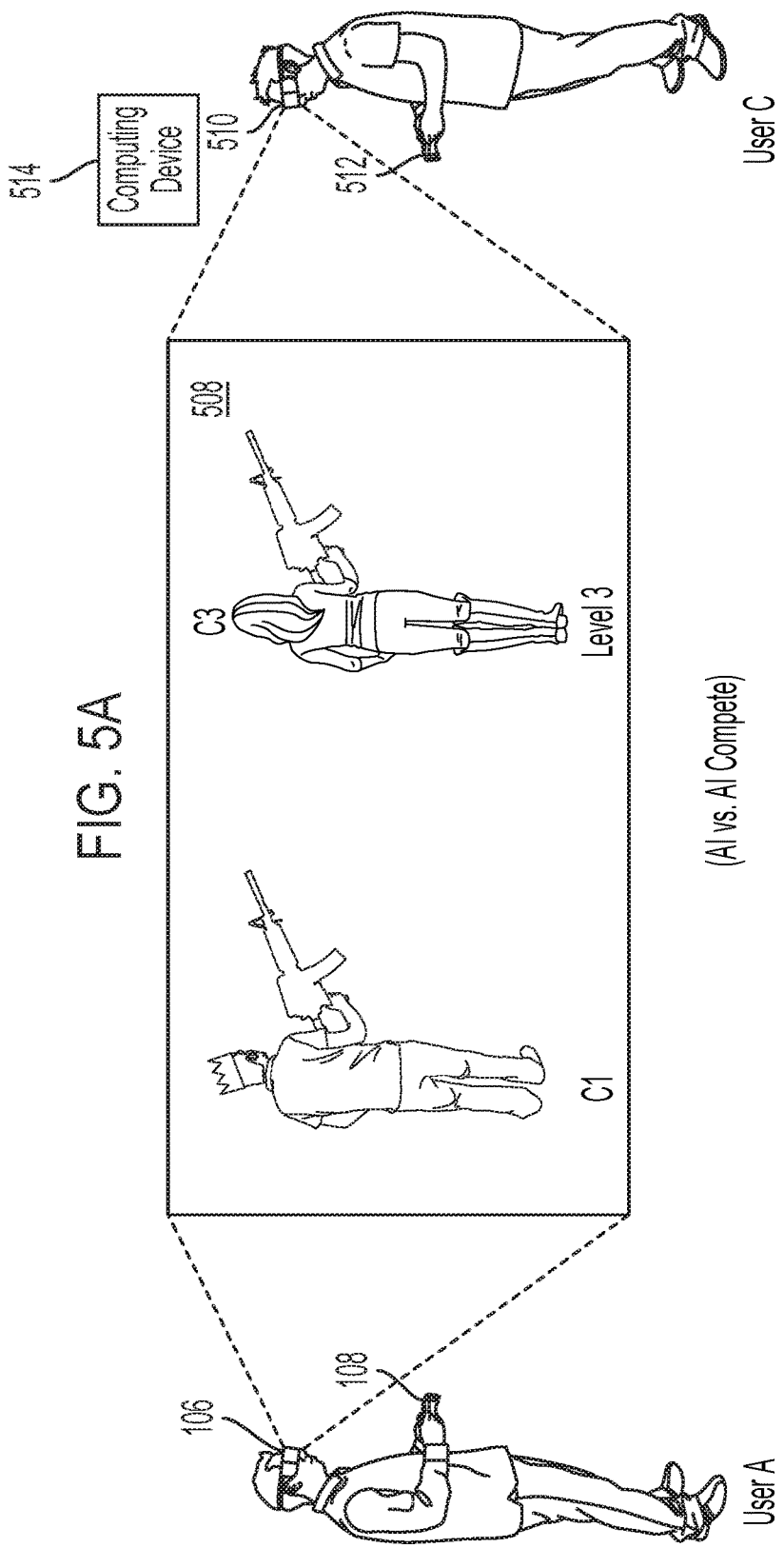
FIG. 5B is a diagram of an embodiment of a virtual scene in which a character is competing with another character during execution of a game program.

FIG. 5B is a diagram of an embodiment of a virtual scene 508 in which the character C1 is competing with the character C3 during execution of the game program. The character C3 that is controlled by an artificial intelligence AI3 assigned to the user account 3 applies one or more interaction patterns, similar to the interaction patterns described herein, to compete against the character C3. The character C3 when controlled by the artificial intelligence model AI3 is an NPC. The user C logs into his/her user account 3 to access the virtual scene 508. The virtual scene 508 is displayed on the HMD 106 and also on an HMD 510 to provide a shared virtual environment. The user C wears the HMD 510 on his or her head in a similar manner in which the user A wears the HMD 106 on his or her head. In the virtual scene 508, the user C controls the character C3 by using a hand-held controller 512 or the artificial intelligence model AI3 controls the character C3, and the user A controls the character C1 by using the hand-held controller 108 or the artificial intelligence model AI1A controls the character C1. The characters C1 and C3 compete with or against each other during execution of the game program for achieving a number of virtual rewards, such as number of virtual coins or a number of virtual points or a number of kills or a game level within the game.

The user C selects, via the hand-held controller 512, a skill level similar to the skill level 3 be applied by the character C3 or the artificial intelligence model AI3. For example, the user C selects the skill level of the character C3 during the competition by selecting a button on the hand-held controller 512. Data indicating the selection is sent via a wired or wireless connection between the hand-held controller 512 and a computing device 514 to the computing device 514. The computing device 514 applies the network communication protocol to packetize the selection data to generate one or more packets and sends the packets via the computer network 102 to one or more servers A, B, and C. The one or more of the servers A, B, and C receive the packets and apply the network communication protocol to the packets to obtain the selection data and analyze the selection data to determine that the user C wishes to apply the skill level of the character C3, and one or more interaction patterns corresponding to the skill level that is selected by the user C are selected by the artificial intelligence model AI3 to be applied during the competition. One or more of the servers A, B, and C apply the artificial intelligence model AI3 to further apply the one or more interaction patterns that correspond to the skill level selected by the user C. For example, when the character C3 is within the virtual scene 202 of FIG. 2, the character C3 will access the virtual object 206 instead of shooting at the virtual object 112.

The artificial intelligence model AI1A sends a request to the artificial intelligence model AI3 for determining the skill level of the character C3. For example, one or more of the servers A, B, and C that apply or execute the artificial intelligence model AI1A send the request with an identity of a user account 3, an identity of the character C3, and an identity of a game session of execution of the game program to one or more of the servers A, B, and C that apply or execute the artificial intelligence model AI3. The artificial intelligence model AI3 executed by one or more of the servers A, B, and C receives the identities of the user account 3, the character C3, and the game session with the request to determine that the request corresponds to the user account 3, the character C3, and the game session, and is for an identity of the skill level of the character C3. The artificial intelligence model AI3 accesses from a database that is stored within one or more of the memory devices of the one or more servers A, B, and C to determine whether there is a permission within the user account 3 to provide the skill level of the character C3 to the artificial intelligence model AI1A. For example, the user C uses the hand-held controller 512 to provide the permission to all artificial intelligence models or to one or more specific artificial intelligence models to access the skill level of the character C3. The permission is sent from the hand-held controller 512 via the wired or wireless connection to the computing device 514. The computing device 514 applies the network communication protocol to packetize the permission to generate one or more packets and sends the one or more packets via the computer network 102 to the one or more servers A, B, and C. The one or more servers A, B, and C associate, such as establish a link between or a one-to-one correspondence between or a mapping between, the permission and the artificial intelligence model AI3 or the user account 3.

Upon determining that the artificial intelligence model AI1A is to be allowed to access the skill level of the character C3, the artificial intelligence model AI3 provides the permission to the artificial intelligence model AI1A. Upon receiving the permission from the artificial intelligence model AI3, the artificial intelligence model AI1A determines to apply the skill level 3 to the character C1 during the competition. The skill level 3 is similar or substantially the same or the same as the skill level of the character C3. As an example, skill levels are substantially the same or similar when the skill levels are within a predetermined range from each other. To illustrate, a skill level of 2.5 is within the pre-determined range from the skill level of 2 and a skill level of 3.4 is within the pre-determined range from the skill level of 3. The artificial intelligence model AI1A accesses patterns that correspond to the skill level 3 of the character C3, such as the one or more additional patterns 204. The artificial intelligence model AI1A applies the patterns that correspond to the skill level 3 to the character C1 during the competition within the game.

In one embodiment, the user C selects the skill level of the character C3 during the competition by making a gesture. Data indicating the gesture is captured by a camera placed in the real-world environment in which the user C is located and sent via a wired or wireless connection between the camera and the computing device 514 to the computing device 514. The computing device 514 applies the network communication protocol to packetize the gesture data to generate one or more packets and sends the packets via the computer network 102 to one or more servers A, B, and C. One or more of the servers A, B, and C receive the packets and apply the network communication protocol to the packets to obtain the gesture data and analyze the gesture data to determine that the user C wishes to apply the skill level of the character C3, and one or more interaction patterns corresponding to the skill level that is selected by the user C are selected by the artificial intelligence model AI3 to be applied during the competition.

In an embodiment, each of the artificial intelligence models AI1A and AI3 collect output data, such as information that includes game scores or virtual points, during the competition, and based on the output data determine patterns that will facilitate training of the artificial intelligence model to win the competition. For example, during the competition, the artificial intelligence model AI1A receives data that the character C3 controlled by the artificial intelligence model AI3 jumps when shot at for a majority of instances. The artificial intelligence model AI1A determines from the data an interaction pattern in which the artificial intelligence model AI3 controls the character C3 to jump. The artificial intelligence model AI1A learns that by controlling the character C1 to jump when the character C3 jumps, the character C3 can be killed easily. During a next competition, the artificial intelligence model AI1A applies its learned operations to control the character C1 to jump and shoot at the character C3 when the character C3 jumps.

Figure 5C:
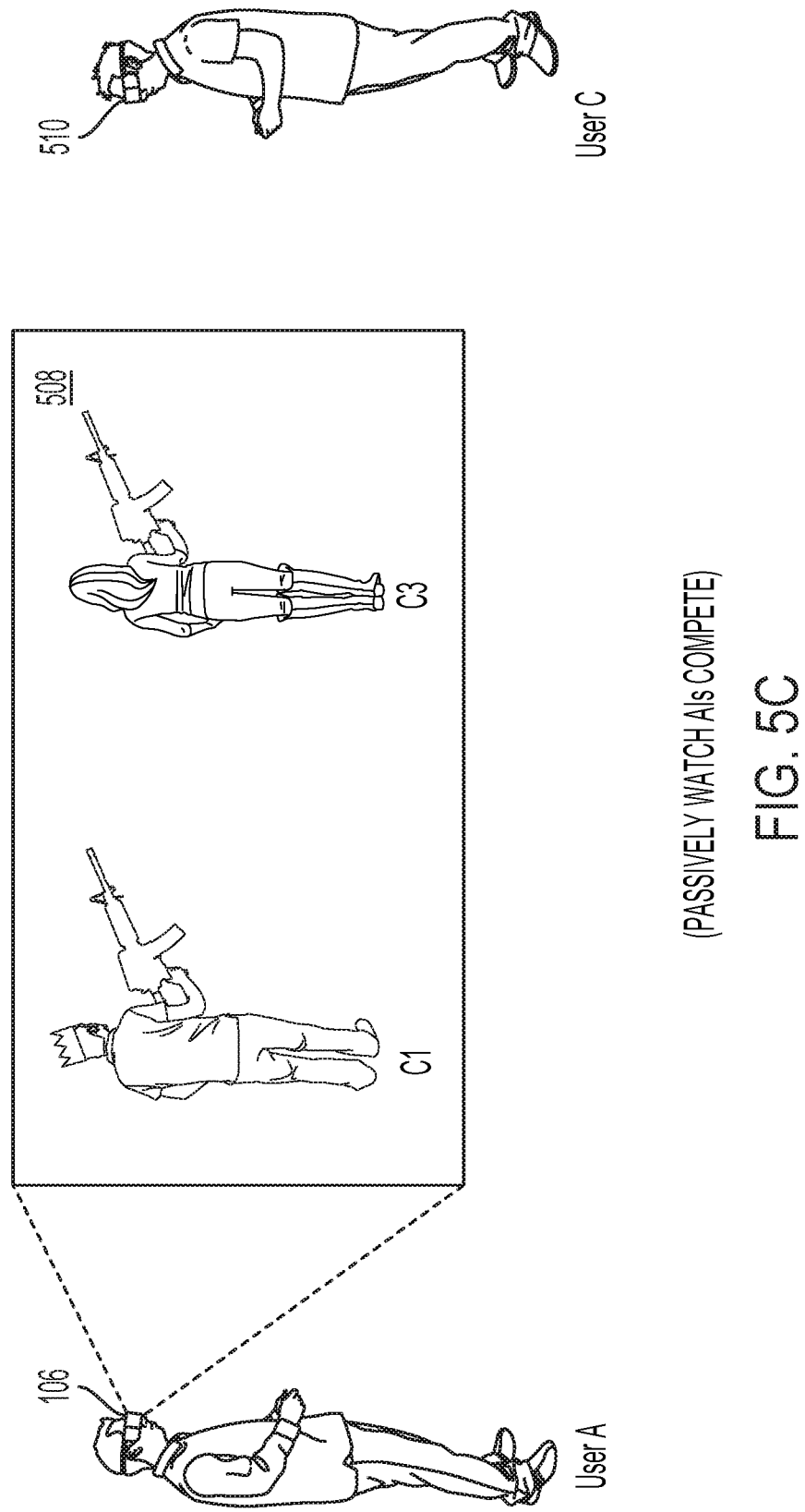
FIG. 5C is an embodiment of a virtual scene to illustrate that users watch the competition between the characters without controlling the characters.

FIG. 5C is an embodiment of the virtual scene 508 to illustrate that the users A and B watch the competition between the characters C1 and C3 without controlling the characters C1 and C3. For example, during the competition, the artificial intelligence model AI1A controls the character C1 and the artificial intelligence model AI3 controls the character C3. To illustrate, during the competition, the one or more interaction patterns 119, or the one or more additional patterns 202, or the one or more other patterns 302, or the one or more additional interaction patterns 408, or a combination thereof, are applied by the artificial intelligence model AI1A to control the character C1. Similarly, during the competition, one or more interaction patterns that correspond to the user account 3 and the artificial intelligence model AI3 are applied by the artificial intelligence model AI3 to control the character C3.

There is no control of the character C1 by the user A via the hand-held controller 106 or by using gestures and there is no control of the character C3 by the user C via the hand-held controller 512 or by using gestures. For example, there is no input data being sent from the hand-held controller 106 via the computing device 104 and the computer network 102 to one or more of the servers A, B, and C to control movement or actions, such as shooting or exploring or retrieving or obtaining or searching, performed by the character C1. Also, there is no input data being sent from the hand-held controller 512 via the computing device 514 and the computer network 102 to one or more of the servers A, B, and C to control movement or actions performed by the character C3. The users A and C are passively watching the competition via their corresponding HMDs 106 and 510 without controlling the corresponding characters C1 and C3. The characters C1 and C3 are being controlled by the corresponding artificial intelligence models AI1A and AI3 without reception of input data. The input data is not generated when a user does not use a hand-held controller or does not make gestures.

Figure 6:
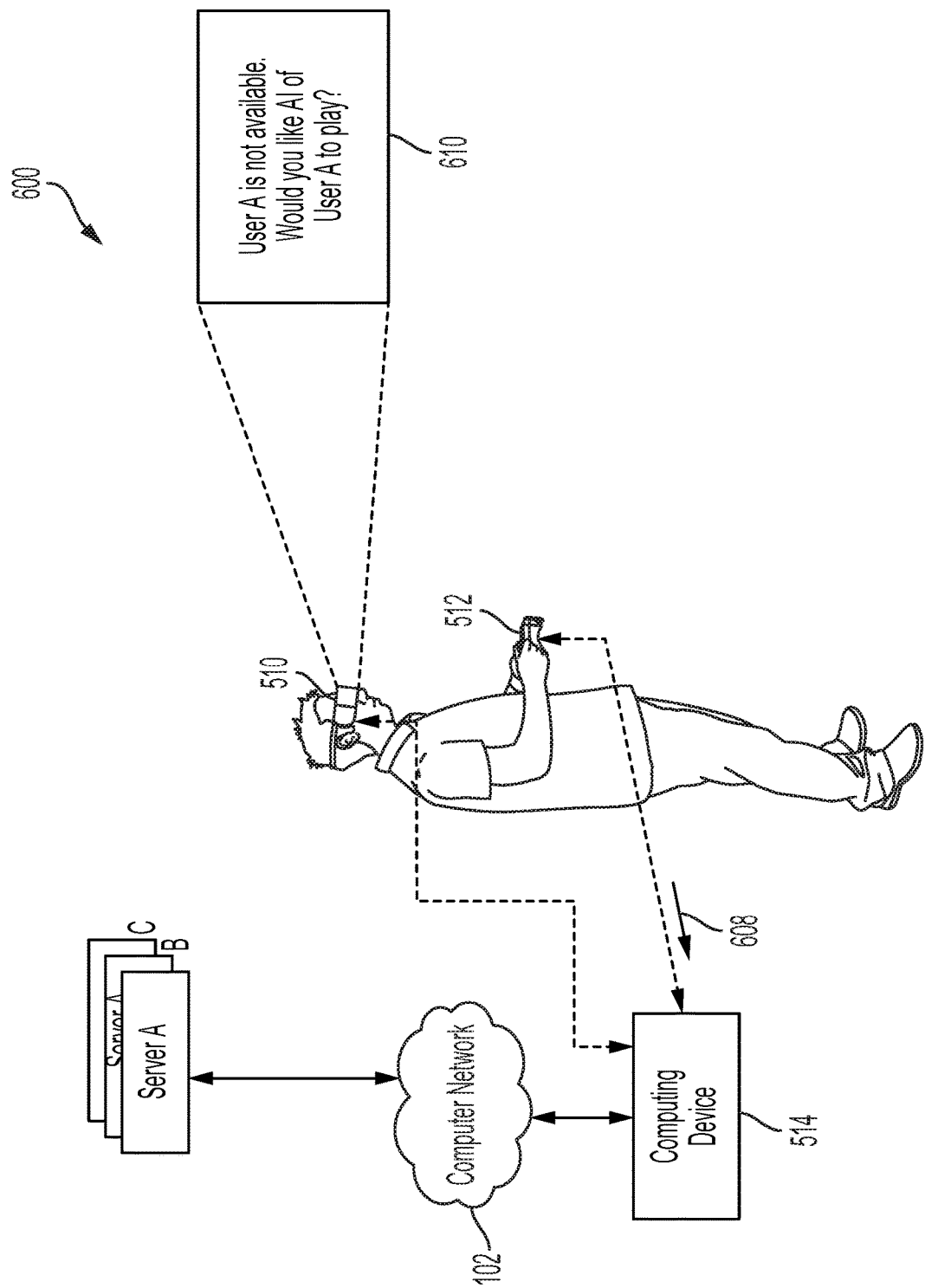
FIG. 6 is a diagram of an embodiment of a system to illustrate a notification displayed on a display device of a head-mounted display (HMD) to indicate to a user that another user is not available to play the game and that instead the artificial intelligence model can play the game with the user.

FIG. 6 is a diagram of an embodiment of a system 600 to illustrate a notification 510 displayed on a display device of the HMD 602 to indicate to the user C that the user A is not available to play the game and that the artificial intelligence model AI1A can play the game with the user C. The user C selects one or more buttons on the hand-held controller 512 to generate input data, which includes a request and an identification of the user account 3 to send via the user account 1 to the user A to play the game. The input data is sent from the hand-held controller 512 the wired or wireless connection via to the computing device 514. The computing device 514 applies the network communication protocol to the input data to generate one or more packets having the input data, and sends the packets via the computer network 102 to the user account 1 having user account information stored in one or more memory devices of one or more of the servers A, B, and C.

When the request is received by the user account 1, the user A is logged out of the user account 1 and is not playing the game. For example, the user A logs out of the user account 1 by using the hand-held controller 108 to select a log out button displayed on the display device of the HMD 106. When the log out button is selected, input data indicating the selection of the log out button is generated by the hand-held controller 108 and is sent from the hand-held controller 108 via the wired or wireless connection to the computing device 104. The computing device 104 packetizes the input data to generate one or more packets and sends the packets and the computer network 102 to one or more of the servers A, B, and C to indicate to one or more of the servers A, B, and C that the user A has logged out of the user account 1. As another example, the user A logs out of the user account by selecting a power off button on the computing device 104.

One or more of the servers A, B, and C generate a response to the request received from the user account 3 to indicate that the user A is logged out of the user account 1 and that the artificial intelligence model AI1A that corresponds to, such as linked to or mapped to, the user account 1 is available to play the game. One or more of the servers A, B, and C apply the network communication protocol to the response to generate one or more packets and sends the packets via the computer network 102 to the computing device 514. The computing device 514 applies the network communication protocol to the packets to obtain the response from the packets and sends data for displaying the response via a wired or wireless connection to the HMD 510.

The HMD 510 displays the response as a notification 610 to indicate to the user C that the user A is not available to play the game and instead the artificial intelligence model AI1A is available to play the game. The notification 610 also includes a question for the user C whether the user C wishes for the artificial intelligence model AI1A to play the game instead of the user A. The user C selects one or more buttons on the hand-held controller 512 to provide an answer the question to generate input data, which is sent from the hand-held controller 512 via the wired or wireless connection to the computing device 514. The computing device 514 applies the network communication protocol to packetize the input data including the answer to generate one or more packets and sends the packets via the computer network 102 to the user account 1 stored within one or more of the servers A, B, and C. One or more of the servers A, B, and C apply the network communication protocol to the packets to obtain the data including the answer, and send the answer to the artificial intelligence model AI1A.

Upon receiving the answer, the artificial intelligence model AI1A plays the game with the user C. For example, one or more servers A, B, and C that are trained based on the one or more interaction patterns 119, the one or more additional patterns 204, or the one or more other patterns 302, or the one or more additional interaction patterns 408, or a combination thereof apply their learned methods from the training to play the game with the user C.

FIG. 7 is a diagram of an embodiment to illustrate a selection of the artificial intelligence model AI1A from multiple artificial intelligence models AI1A, AI2A, and AI3A, all of which correspond to the user account 1. For example, the artificial intelligence model AI2A is trained based on one or more interaction patterns to control another character C11 during execution of the game program and the artificial intelligence model AI3A is trained based on one or more interaction patterns to control yet another character C12 during execution of the game program. As another example, the artificial intelligence model AI1A controls the character C1 having the skill level 2, the artificial intelligence model AI2A controls the character C1 having the skill level 3 or 4, and the artificial intelligence model AI3A controls the character C1 having the skill level 5. The artificial intelligence models AI2A and AI3A are generated in a similar manner in which the artificial intelligence model AI1A is generated, and is executed by one or more of the servers A, B, and C.

The one or more servers A, B, and C generate one or more image frames including data for displaying a virtual scene 702. One or more of the servers A, B, and C apply the network communication protocol to the image frames to generate one or more packets and send the packets via the computer network 102 to the computing device 104. The computing device 104 applies the network communication protocol to the packets to obtain the image frames and sends the image frames via the wired or wireless connection to the HMD 106 for display of the virtual scene 702 on the display device of the HMD 106.

Upon viewing the virtual scene 702 during execution of the game program, the user A uses the hand-held controller 108 to select one or more buttons to select the artificial intelligence model AI1A for playing the game. Input data that includes the selection is sent from the hand-held controller 108 via the wired or wireless connection to the computing device 104. The computing device 104 applies the network communication protocol to packetize the selection to generate one or more packets and sends the packets via the computer network 102 to one or more of the servers A, B, and C.

One or more of the servers A, B, and C apply the network communication protocol to the packets to obtain the selection and determine to apply the artificial intelligence model AI1A for the play of the game. Similarly, other artificial intelligence models AI2A and AI3A are selected by the user A via the hand-held controller 108. When the artificial intelligence model AI1A is applied, the character C1 is controlled by the artificial intelligence model AI1A during execution of the game program.

In an embodiment, one of the artificial intelligence models AI1A, AI2A, and AI3A are selected by the user A by making gestures, which are captured by the camera in the real-world environment to generate gesture data. The gesture data is sent from the camera to the computing device 104 via the wired or wireless connection between the camera and the computing device 104. The computing device 104 generates and sends one or more packets including the gesture data via the computer network 102 to one or more of the servers A, B, and C.

Figure 8A:
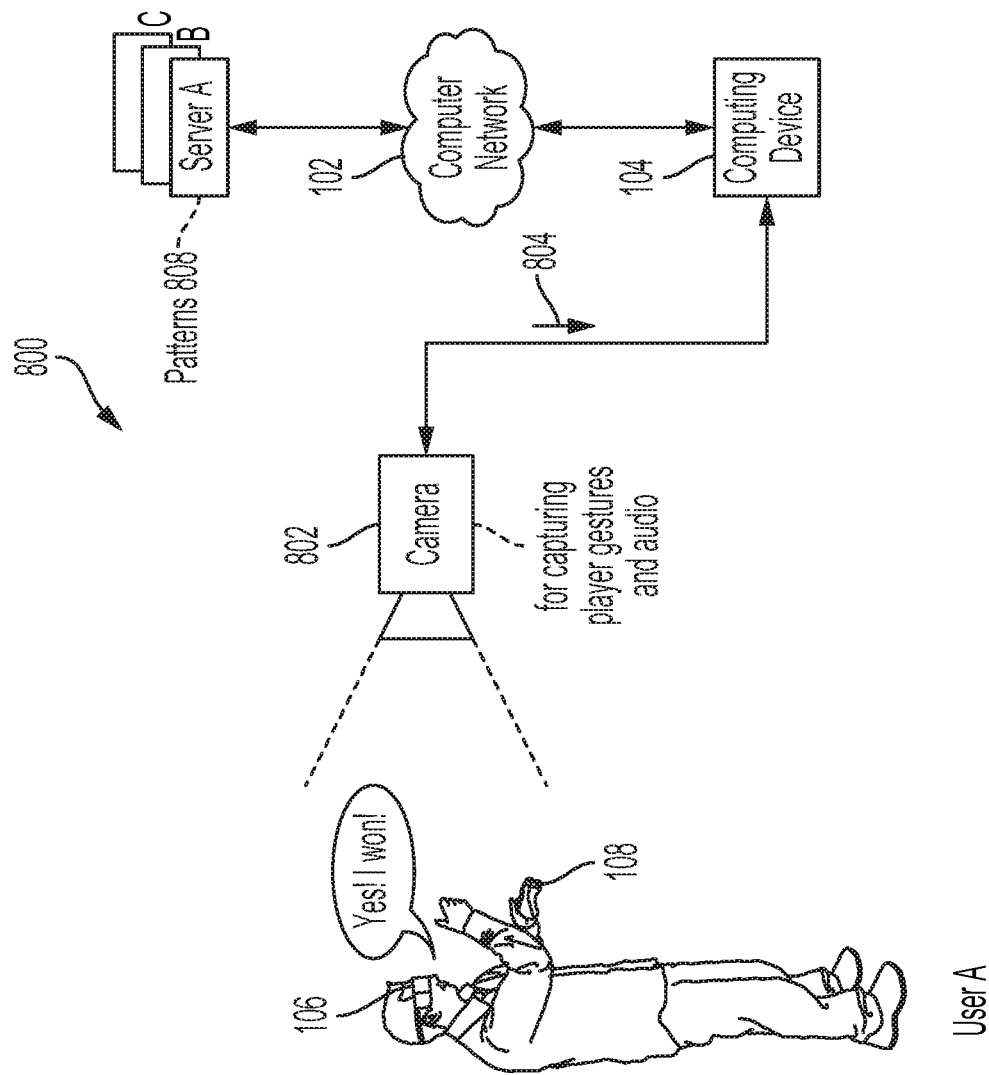
FIG. 8A is a diagram of an embodiment of a system to illustrate capturing of gestures that are performed by a user during execution of the game program to allow the artificial intelligence model to apply the gestures to a character.

FIG. 8A is a diagram of an embodiment of a system 800 to illustrate capturing of gestures that are made by the user A during execution of the game program to allow the artificial intelligence model AI1A to apply the gestures to the character C1. The system 800 includes the HMD 106, the hand-held controller 108, a camera 802, the computing device 104, the computer network 102, and the servers A, B, and C.

The camera 802 is coupled to the computing device via a wired or wireless connection. During a play of the game, the user A makes one or more gestures. For example, the user 106 raises his/her right-hand in the air and him shouts loudly "Yes! I won" after killing a virtual character in the game. The camera 802 records the one or more gestures that are made by the user A during execution of the game program to generate gesture data 804, which is an example of input data, and sends the gesture data 804 via the wired or wireless connection to the computing device 104. The gesture data 804 includes audio data and video data.

The computing device 104 applies the network communication protocol to the gesture data 804 to generate one or more packets and sends the packets via the computer network 102 to one or more of the servers A, B, and C that execute the game program. One or more of the servers A, B, and C apply the network communication protocol to obtain the gesture data 804 from the packets, and apply the gesture data to train the artificial intelligence model AI1A. For example, one or more of the servers A, B, and C identify patterns 808 from the gesture data 804 and integrate, such as add, the patterns 808 to its methods that are learned from the one or more interaction patterns 119, the one or more additional patterns 204, one or more other patterns 302, and/or the one or more additional interaction patterns 408 to train the artificial intelligence model AI1A. To illustrate, one or more of the servers A, B, and C train the artificial intelligence model AI1A to move a right hand or a left hand of the character C1 in the air after killing a virtual character in the game or after shooting at and destroying a flying virtual vehicle in the game or after winning a virtual point in the game or after increasing a health level during execution of the game program and to move a mouth of the character C1 to utter words "Yes! I won" or "I won!" or "Yay!" or "Very nice!". As another illustration, one or more of the servers A, B, and C train the artificial intelligence model AI1A to control the character C1 to dance after a kill or winning a virtual point in the game or after an increase in a health level in the game and to control the mouth of the character C1 to utter one or more of the words.

Figure 8B:
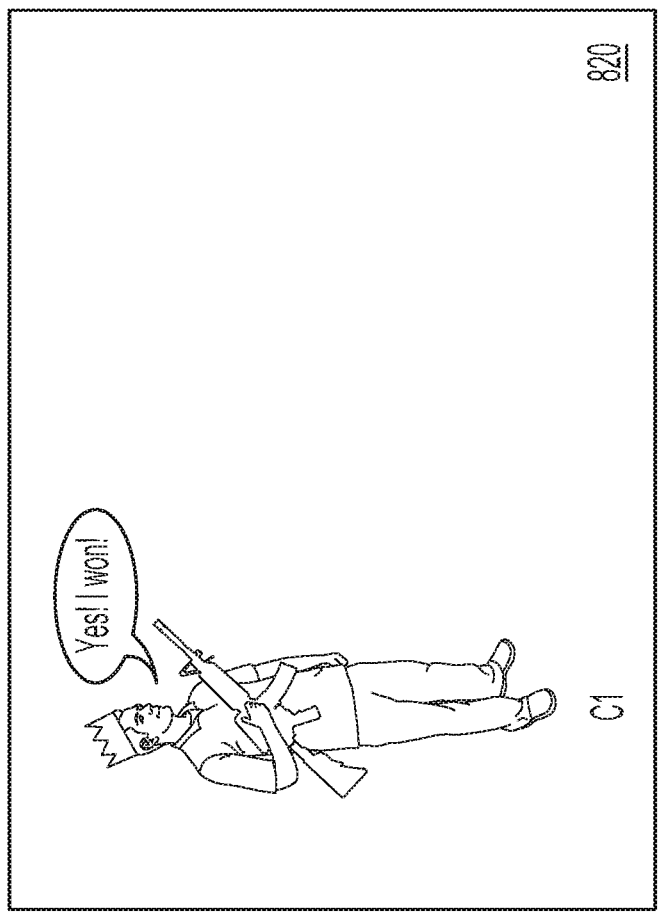
FIG. 8B is a diagram of an embodiment of a virtual scene that is displayed on the HMD to illustrate that a character performs actions that are similar to actions or gestures performed by the user during a play of the game.

FIG. 8B is a diagram of an embodiment of a virtual scene 820 that is displayed on the HMD 106 worn by the user A to illustrate that the character C1 performs actions that are similar to that of the user A during the play of the game. As illustrated in the virtual scene 820, the character C1 raises its right hand and outputs a sound indicating "I have won!" after achieving a game level or a virtual point or a virtual coin or a health level during execution of the game. For example, one or more of the servers A, B, and C determine that during execution of the game, the character C1 has won a virtual point or achieved a game level or increased its health level. Upon determining so, one or more of the servers A, B, and C apply the artificial intelligence model AI1A to generate one or more image frames and audio frames that are similar to the actions performed by the user A after a win, such as a kill or a winning a point or achieving a game level or a health level. The image frames and the audio frames are packetized by one or more of the servers A, B, and C by applying the network communication protocol to generate one or more packets. One or more of the servers A, B, and C sends the packets having the image frames and the audio frames via the computer network 102 to the computing device 104. The computing device 104 applies the network communication protocol to obtain the image frames and the audio frames from the packets, and sends the image frames and the audio frames via the wired or wireless connection to the HMD 106. The display device of the HMD 106 displays the image frames to display the virtual scene 820 that includes the character C1 raising its right hand to celebrate its victory. Moreover, an audio device, which includes one or more audio amplifiers coupled to one or more audio speakers, of the HMD 106 processes the audio frames to output the sound as being emitted by the character C1.

In an embodiment, any of the interaction patterns described herein are used to train an AI model, described herein, or to help the AI model learn to produce learned methods. The AI model applies its learned methods to output decisions, such as AI outputs, and there is no control of the AI model by a user while applying the learned methods to output the decisions. As an example, the decisions are applied to new virtual scenes.

Although the embodiments, described herein, are described with reference to virtual scenes, in one embodiment, the embodiments apply equally to augmented reality (AR) scenes. For example, the character C1 is controlled by the artificial intelligence model AI1A within an AR scene that is displayed on the HMD 106 and the character C3 is controlled by the artificial intelligence model AI3 within an AR scene that is displayed on the HMD 510. Data including a portion of an AR scene displayed on an HMD is captured by a camera in the same real-world environment in which a user wearing the HMD is located. The portion of the AR scene is a portion of the real-world environment that is in front of the user. The data is sent from the camera via a wired or wireless connection to a computing device. The computing device applies the network communication protocol to packetize the data to generate one or more packets and sends the packets via the computer network 102 to one or more of the servers A, B, and C. One or more of the servers A, B, and C apply the artificial intelligence model AI1A to generate one or more image frames to overlay the character C1 on top of the data captured by the camera that is coupled to the computing device 104. Similarly, one or more of the servers A, B, and C apply the artificial intelligence model AI3 to generate one or more image frames to overlay the character C3 on top of the data captured by the camera that is coupled to the computing device 514. The image frames are packetized by one or more of the servers A, B, and C, and sent by the computer network 102 to the corresponding computing devices 104 and 514. The computing device 104 applies the network communication protocol to obtain the image frames from the packets and sends the image frames to the HMD 106 for display of the AR scene on the HMD 106. The AR scene displayed on the HMD 106 includes the portion of the real-world environment in which the user A is located and the character C1 that is overlaid on top of the data of the real-world environment. Similarly, the computing device 514 applies the network communication protocol to obtain the image frames from the packets and sends the image frames to the HMD 512 for display of the AR scene on the HMD 512. The AR scene displayed on the HMD 512 includes the portion of the real-world environment in which the user C is located and the character C3 that is overlaid on top of the data of the real-world environment.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a read-only memory (ROM), a random access memory (RAM), a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for training a character for a game, comprising:
   facilitating a display of one or more scenes of the game, wherein the one or more scenes include the character and virtual objects;
   receiving input data indicating control of a hand-held controller by a user for controlling a movement of the character to interact with the virtual objects of the one or more scenes of the game;
   analyzing the input data to identify interaction patterns between the character and the virtual objects in the one or more scenes, wherein the interaction patterns define inputs to train an artificial intelligence (AI) model associated with a user account of the user;
   accessing, by the AI model, the game without receiving a user input from the user, wherein the game is accessed by the AI model to control the character to interact with a an additional scene of the game; and
   tracking the interaction between the additional scene and the character controlled by the AI model to perform additional training of the AI model.

2. The method of claim 1, wherein the additional training of the AI model is by interaction caused by the character when automatically controlled using decisions made using the AI model.

3. The method of claim 2, wherein the decisions made using the AI model do not include control from the user.

4. The method of claim 1, wherein the input data is received via a computer network, wherein said analyzing the input data includes:
   identifying features associated with the input data, wherein the features are associated with the character and the virtual objects in the one or more scenes;
   classifying the features to output classifiers, wherein each of the classifiers is associated with a corresponding function performed by the character;
   providing the classifiers as inputs to train the AI model.

5. The method of claim 1, further comprising:
   requesting permission from another user account to access another AI model;
   requesting additional interaction patterns used to train the other AI model;
   applying the additional interaction patterns to train the AI model.

6. The method of claim 1, further comprising:
   analyzing outputs achieved by applying the interaction patterns to the AI model;
   analyzing additional outputs by applying other interaction patterns to the AI model;
   determining whether the additional outputs exceed the outputs;
   training the AI model based on the other interaction patterns in response to determining that the additional outputs exceed the outputs; and
   determining to apply the AI model that is trained based on the other interaction patterns for additional instances of the one or more virtual scenes.

7. The method of claim 1, further comprising:
   providing a new scene to the character to enable the AI model to train from the new scene, wherein the new scene includes a virtual object that is not present in the one or more scenes or excludes one or more of the virtual objects present in the one or more scenes or a combination thereof;
   receiving reaction data of the character controlled by the AI model when the character reacts to the new scene;
   applying by the AI model of the reaction data to perform further training, wherein the further training is performed by identifying additional interaction patterns associated with the reaction data.

8. The method of claim 7, further comprising:
   assigning a skill level to the AI model before the training, a skill level to the AI model after the training, a skill level to the AI model before the further training, and a skill level to the AI model after the further training;
   requesting a skill level of another AI model;
   applying one of the skill levels of the AI model corresponding to the skill level of the other AI model in a competition between the AI model and the other AI model.

9. The method of claim 8, wherein the character is not controlled by the user and is controlled by the AI model during the competition and the other character is controlled by the other AI model during the competition.

10. The method of claim 1, further comprising:
   determining that a request is received from another user to play the game with the user;
   identifying that the user is logged out of the user account in response to receiving the request;
   generating data for displaying that instead of the user the AI model is available to play the game with the other user.

11. The method of claim 1, further comprising:
receiving a recording of gesture data of the user and voice data of the user during the display of the one or more scenes of the game;
integrating the gesture data and the voice data with the inputs used to train the AI model to enable the character to apply gestures and voices.

12. A server for training a character for a game, comprising:
a processor configured to facilitate a display of one or more scenes of the game, wherein the one or more scenes include the character and virtual objects;
wherein the processor is configured to receive input data indicating control of a hand-held controller by a user for controlling the character to interact with the virtual objects of the one or more scenes of the game;
wherein the processor is configured to analyze the input data to identify interaction patterns between the character and the virtual objects in the one or more scenes, wherein the interaction patterns define inputs to train an artificial intelligence (AI) model associated with a user account of the user;
wherein the processor is configured to provide the AI model with access to the game without receiving a user input from the user, wherein the game is accessed by the AI model to control the character to interact with an additional scene of the game, and
wherein the processor is configured to track the interaction between the additional scene and the character controlled by the AI model to perform additional training of the AI model; and
a memory device coupled to the processor, wherein the memory device is configured to store the AI model.

13. The server of claim 12, wherein the processor is configured to enable the character to interact with a new scene, wherein to enable the character to interact with the new scene, the processor is configured to apply the AI model to the new scene.

14. The server of claim 12, wherein the input data is received via a computer network, wherein to analyze the input data, the processor is configured to:
identify features associated with the input data, wherein the features are associated with the character and the virtual objects in the one or more scenes;
classify the features to output classifiers, wherein each of the classifiers is associated with a corresponding function performed by the character;
provide the classifiers as inputs to train the AI model.

15. The server of claim 12, wherein the processor is configured to:
request permission from another user account to access another AI model;
request additional interaction patterns used to train the other AI model;
apply the additional interaction patterns to train the AI model.

16. The server of claim 12, wherein the processor is configured to:
analyze outputs achieved by applying the interaction patterns to the AI model;
analyze additional outputs by applying other interaction patterns to the AI model;
determine whether the additional outputs exceed the outputs;
train the AI model based on the other interaction patterns in response to determining that the additional outputs exceed the outputs; and determine to apply the AI model that is trained based on the other interaction patterns for additional instances of the one or more virtual scenes.

17. The server of claim 12, wherein the processor is configured to:
provide a new scene to the character to enable the AI model to train from the new scene, wherein the new scene includes a virtual object that is not present in the one or more scenes or excludes one or more of the virtual objects present in the one or more scenes or a combination thereof;
receive reaction data of the character controlled by the artificial intelligence model when the character reacts to the new scene;
provide the reaction data to the AI model to perform further training, wherein the further training is performed by identifying additional interaction patterns associated with the reaction data.

18. The server of claim 17, wherein the processor is configured to:
assign a skill level to the AI model before the training, a skill level to the AI model after the training, a skill level to the AI model before the further training, and a skill level to the AI model after the further training;
detect a skill level of another AI model;
apply one of the skill levels of the AI model corresponding to the skill level of the other AI model in a competition between the AI model and the other AI model.

19. The server of claim 18, wherein the character is not controlled by the user and is controlled by the AI model during the competition and the other character is controlled by the other AI model during the competition.

20. The server of claim 12, wherein the processor is configured to:
determine that a request is received from another user to play the game with the user;
detect that the user is logged out of the user account in response to receiving the request;
generate data for displaying that instead of the user the AI model is available to play the game with the other user.

21. The server of claim 12, wherein the processor is configured to:
receive a recording of gesture data of the user and voice data of the user during the display of the one or more scenes of the game;
integrate the gesture data and the voice data with the inputs used to train the AI model to enable the character to apply gestures and voices.

22. A non-transitory computer readable medium containing program instructions, wherein execution of the program instructions by one or more processors of a computer system causes the one or more processors to carry out a plurality of operations of:
facilitating a display of one or more scenes of a game, wherein the one or more scenes include a character and virtual objects;
receiving input data indicating control of a hand-held controller by a user for controlling the character to interact with the virtual objects of the one or more scenes of the game;
analyzing the input data to identify interaction patterns between the character and the virtual objects in the one or more scenes, wherein the interaction patterns define inputs to train an artificial intelligence (AI) model associated with a user account of the user;

accessing, by the AI model, the game without receiving a user input from the user, wherein the game is accessed by the AI model to control the character to interact with an additional scene of the game; and tracking the interaction between the additional scene and the character controlled by the AI model to perform additional training of the AI model.

23. The non-transitory computer readable medium of claim 22, further comprising enabling the character to interact with a new scene by applying the AI model to the new scene.

* * * * *